US010124890B2

(12) United States Patent
Sada-Salinas et al.

(10) Patent No.: US 10,124,890 B2
(45) Date of Patent: Nov. 13, 2018

(54) MODULAR NACELLES TO PROVIDE VERTICAL TAKEOFF AND LANDING (VTOL) CAPABILITIES TO FIXED WING AERIAL VEHICLES, AND ASSOCIATED SYSTEMS AND METHODS

(71) Applicants: Jaime G. Sada-Salinas, San Antonio, TX (US); David Alejandro Arellano-Escarpita, Durango (MX)

(72) Inventors: Jaime G. Sada-Salinas, San Antonio, TX (US); David Alejandro Arellano-Escarpita, Durango (MX)

(73) Assignee: DronetechUAV Corporation, San Antonio, TX (US)

( * ) Notice: Subject to any disclaimer, the term of this patent is extended or adjusted under 35 U.S.C. 154(b) by 629 days.

(21) Appl. No.: 14/678,534

(22) Filed: Apr. 3, 2015

(65) Prior Publication Data
US 2016/0297520 A1    Oct. 13, 2016

Related U.S. Application Data

(60) Provisional application No. 61/978,617, filed on Apr. 11, 2014, provisional application No. 62/005,900, filed on May 30, 2014.

(51) Int. Cl.
*B64C 29/00* (2006.01)
*B64C 39/02* (2006.01)
(Continued)

(52) U.S. Cl.
CPC ........ *B64C 29/0025* (2013.01); *B64C 39/024* (2013.01); *B64D 1/02* (2013.01);
(Continued)

(58) Field of Classification Search
CPC ....... B64C 3/32; B64C 27/08; B64C 29/0025; B64C 29/0091; B64C 31/024;
(Continued)

(56) References Cited

U.S. PATENT DOCUMENTS 1,919,682 A    7/1933  Bellanca
2,140,783 A   12/1938  Bellanca
(Continued)

FOREIGN PATENT DOCUMENTS

FR          2993859 A1    1/2014
KR    10-2003-0049796 A   6/2003
(Continued)

OTHER PUBLICATIONS

International Search Report and Written Opinion issued in PCT/US2015/024295, dated Jul. 17, 2015, 15 pp.
(Continued)

*Primary Examiner* — Richard R. Green
*Assistant Examiner* — Brady W Frazier
(74) *Attorney, Agent, or Firm* — Perkins Coie LLP

(57) ABSTRACT

Modular nacelles to provide vertical takeoff and landing (VTOL) capabilities to fixed-wing aerial vehicles, and associated systems and methods are disclosed. A representative system includes a nacelle, a power source carried by the nacelle, and multiple VTOL rotors carried by the nacelle and coupled to the power source. The system can further include an attachment system carried by the nacelle and configured to releasably attach the nacelle to an aircraft wing.

20 Claims, 23 Drawing Sheets

(51) Int. Cl.
  *B64D 1/02* (2006.01)
  *B64D 29/02* (2006.01)
  *B64D 17/80* (2006.01)
  *B64D 27/24* (2006.01)
  *B64D 27/26* (2006.01)
(52) U.S. Cl.
  CPC ............. *B64D 17/80* (2013.01); *B64D 27/24* (2013.01); *B64D 27/26* (2013.01); *B64D 29/02* (2013.01); *B64C 2201/021* (2013.01); *B64C 2201/088* (2013.01); *B64C 2201/104* (2013.01)
(58) Field of Classification Search
  CPC ............ B64C 39/024; B64C 2201/021; B64C 2201/088; B64C 2201/104; B64D 1/02; B64D 17/80; B64D 27/00; B64D 27/24; B64D 27/26; B64D 29/02
  USPC ........................................................ 244/7 R
  See application file for complete search history.

(56) References Cited

U.S. PATENT DOCUMENTS

| | | | |
|---|---|---|---|
| 2,348,792 A | 5/1944 | Dornier | |
| 2,465,703 A * | 3/1949 | Allen ...................... | B64C 27/26 244/7 R |
| 2,481,502 A * | 9/1949 | Downing ............ | B64C 29/0025 244/6 |
| 2,797,881 A * | 7/1957 | Andrews .................. | B64D 5/00 244/2 |
| 2,843,337 A * | 7/1958 | Bennett .................... | B64D 5/00 244/2 |
| 2,879,013 A * | 3/1959 | Herrick ............... | B64C 29/0025 244/221 |
| 2,921,756 A * | 1/1960 | Borden .................... | B64D 5/00 244/2 |
| 3,096,041 A * | 7/1963 | Cheeseman ............. | B64C 27/26 244/7 R |
| 3,134,561 A | 5/1964 | Clejan | |
| 3,298,633 A * | 1/1967 | Dastoli ............... | B64C 29/0033 244/2 |
| 3,389,878 A * | 6/1968 | Westrup .............. | B64C 29/0033 244/12.1 |
| 3,404,852 A * | 10/1968 | Sambell .............. | B64C 29/0033 244/17.13 |
| 3,448,945 A * | 6/1969 | Ascani, Jr. .......... | B64C 29/0025 244/12.3 |
| 3,515,500 A * | 6/1970 | Nachod ............... | B64C 29/0033 244/12.3 |
| 3,592,412 A * | 7/1971 | Glatfelter ............ | B64C 29/0033 244/7 A |
| 3,831,888 A * | 8/1974 | Baker .................... | B64D 27/18 244/54 |
| 3,837,602 A * | 9/1974 | Mullins .................. | B64D 27/18 244/54 |
| 4,678,141 A * | 7/1987 | Sarrantonio ............ | B64C 37/02 244/2 |
| 4,789,115 A * | 12/1988 | Koutsoupidis .......... | B64C 27/26 244/215 |
| 5,085,315 A * | 2/1992 | Sambell .................. | B64C 27/30 244/17.25 |
| 5,782,427 A * | 7/1998 | Hermach ............... | B64D 27/08 244/120 |
| 5,890,441 A | 4/1999 | Swinson | |
| 6,340,133 B1 * | 1/2002 | Capanna ............ | B64C 29/0083 244/12.3 |
| 6,367,738 B1 | 4/2002 | Wadleigh et al. | |
| 6,622,962 B1 * | 9/2003 | White ................ | B64C 27/26 244/12.3 |
| 7,237,750 B2 * | 7/2007 | Chiu ...................... | A45C 13/02 244/119 |
| 7,549,604 B2 | 6/2009 | Hutterer et al. | |
| 7,946,530 B1 * | 5/2011 | Talmage, Jr. ......... | B64C 27/006 244/118.2 |
| 8,152,096 B2 | 4/2012 | Smith et al. | |
| 8,376,264 B1 * | 2/2013 | Hong ...................... | B64C 27/26 244/17.23 |
| 8,660,712 B2 * | 2/2014 | Grabowsky ............... | B64C 3/56 244/117 R |
| 8,740,134 B2 * | 6/2014 | Suzuki .................... | B64C 37/02 244/110 F |
| 9,085,355 B2 | 7/2015 | Delorean | |
| 9,527,597 B1 | 12/2016 | Sada-Salinas | |
| 2002/0074454 A1 * | 6/2002 | Henderson ............ | B64C 39/024 244/135 A |
| 2003/0006339 A1 * | 1/2003 | Capanna ................. | B64C 29/02 244/7 R |
| 2003/0066932 A1 * | 4/2003 | Carroll .................. | B64C 39/024 244/120 |
| 2006/0151666 A1 | 7/2006 | Vandermey et al. | |
| 2007/0187547 A1 * | 8/2007 | Kelly ....................... | B64B 1/20 244/7 R |
| 2008/0099599 A1 | 5/2008 | Hutterer et al. | |
| 2008/0184906 A1 | 8/2008 | Kejha et al. | |
| 2009/0294573 A1 * | 12/2009 | Wilson .................. | B64C 39/024 244/2 |
| 2010/0072325 A1 * | 3/2010 | Sambell .................. | B64C 11/28 244/7 A |
| 2011/0031355 A1 * | 2/2011 | Alvarez Calderon F. .................... | B64C 3/10 244/7 R |
| 2011/0056183 A1 | 3/2011 | Sankrithi et al. | |
| 2012/0025012 A1 | 2/2012 | Arlton et al. | |
| 2012/0261523 A1 * | 10/2012 | Shaw .................. | B64C 29/0033 244/7 R |
| 2013/0020429 A1 * | 1/2013 | Kroo ........................ | B64C 3/16 244/6 |
| 2014/0061376 A1 * | 3/2014 | Fisher ..................... | B60K 1/00 244/62 |
| 2015/0115096 A1 * | 4/2015 | Rossi ..................... | B64C 37/02 244/2 |

FOREIGN PATENT DOCUMENTS

| | | |
|---|---|---|
| WO | 2010020199 A1 | 2/2010 |
| WO | 2015138217 A1 | 9/2015 |

OTHER PUBLICATIONS

Dornier Seastar. Last modified: Jun. 23, 2015. In Wikipedia. Retrieved on Jul. 17, 2015, from https://en.wikipedia.org/w/index.php?title=Dornier_Seastar&oldid=668363573, 3 pages.

Cessna Skymaster. Last modified: Jul. 7, 2015. In Wikipedia. Retrieved on Jul. 17, 2015, from https://en.wikipedia.org/w/index/php?title=Cessna_Skymaster&oldid=670410418, 6 pages.

Star Kraft, Aircraft Designs. Retrieved on Jun. 2, 2014, from http://www.aircraftdesigns.com/starkraft.html, 2 pages.

Moynet Jupiter. Last modified: Jun. 12, 2013. In Wikipedia. Retrieved Jun. 2, 2014 from http://en.wikipedia.org/wiki/Moynet_Jupiter, 4 pages.

Arcturus UAV, JUMP Fixed Wing VTOL UAV. Retrieved on Jun. 2, 2014, from http://www.arcturus-uav.com/aircraft_jump.html, 1 page.

Latitude Engineering, Hybrid Quadrotor, "Latitude has developed a new concept for long endurance Vertical Takeoff and Landing . . . ". Retrieved on Jun. 2, 2014, from https://latitudeengineering.com/products/hq/, 7 pages.

Aero Design DG-1. Last modified Jun. 23, 2015. In Wikipedia. Retrieved on Oct. 9, 2015, from https://en.wikipedia.org/wiki/Aero_Design_DG-1, 2 pages.

Aeronix Airelle. Last modified Jun. 23, 2015. In Wikipedia. Retrieved on Oct. 9, 2015, from https://en.wikipedia.org/wiki/Aeronix_Airelle, 3 pages.

Dornier Do 335. Last modified Sep. 13, 2015. In Wikipedia. Retrieved on Oct. 9, 2015, from https://en.wikipedia.org/wiki/Dornier_Do_335, 7 pages.

(56) References Cited

OTHER PUBLICATIONS

Flylab Tucano. Last modified Jun. 23, 2015. In Wikipedia. Retrieved from https://en.wikipedia.org/wiki/Flylab_Tucano, 3 pages.

IAI RQ-5 Hunter. Last modified Jun. 24, 2015. In Wikipedia. Retrieved on Oct. 9, 2015, from https://en.wikipedia.org/wiki/IAI_RQ-5_Hunter, 2 pages.

Rutan Defiant. Last modified Jul. 20, 2015. In Wikipedia. Retrieved on Oct. 9, 2015, from https://en.wikipedia.org/wiki/Rutan_Defiant, 3 pages.

TAI Baykus. Last modified Oct. 7, 2013. In Wikipedia. Retrieved on Oct. 9, 2015, from https://en.wikipedia.org/wiki/TAI_Bayku%C5%9F, 2 pages.

TAI Pelikan. Last modified Oct. 7, 2013. In Wikipedia. Retrieved on Oct. 9, 2015, from https://en.wikipedia.org/wiki/TAI_Pelikan, 2 pages.

\* cited by examiner

MODULAR NACELLES TO PROVIDE VERTICAL TAKEOFF AND LANDING (VTOL) CAPABILITIES TO FIXED WING AERIAL VEHICLES, AND ASSOCIATED SYSTEMS AND METHODS

CROSS-REFERENCE TO RELATED APPLICATIONS

The present application claims priority to the following U.S. provisional applications, both of which are incorporated herein by reference: U.S. Provisional Patent Application No. 61/978,617 filed Apr. 11, 2014; and U.S. Provisional Patent Application No. 62/005,900 filed May 30, 2014.

TECHNICAL FIELD

This disclosure relates, generally, to the field of aviation, and more specifically to systems usable to provide vertical takeoff and landing capabilities to Fixed Wing Aircraft Vehicles (FWAVs), e.g., to allow operation of vehicles in locations having constrained spaces for take-off and landing.

BACKGROUND

A fixed-wing aerial vehicle (FWAV) is an aircraft capable of flight using a fixed set of wings that generate lift caused by the vehicle's forward airspeed and the shape of the wings.

A FWAV controlled by an aircrew located at the aircraft's flight deck is called a Fixed Wing Manned Aerial Vehicle (FWMAV). If the FWAV does not require an onboard aircrew, it is known as a Fixed Wing Unmanned Aerial Vehicle (FWUAV).

FWUAV's are typically controlled either by an electronic computer located within the aircraft itself or remotely, by a navigator or pilot located on the ground, air, sea or elsewhere, remote from the FWUAV.

The minimum airspeed required to sustain flight is referred to as "stall speed," and a FWAV requires attaining such airspeed to takeoff. Most commonly, FWAVs depend on on-board power to accelerate up to takeoff speed, rolling on a runway if equipped with wheeled landing gear, or over the water if equipped with floating devices.

To reduce the takeoff roll length, auxiliary onboard or external thrusters can be used to increase acceleration of a FWAV over the takeoff roll.

Landing maneuvers utilize steps in opposition to those used when taking off: the FWAV approaches the designed landing zone, maintaining airspeed just above the stall speed. Once the FWAV touches the landing surface, the engine power is set to minimum, and the speed of the vehicle reduces to zero.

Some devices installed on the aircraft are employed to reduce the landing roll distance, such as wheel brakes, brake parachutes, spoilers, airbrakes, etc.

Also, external devices can be used to further reduce the landing roll distance, such as arresting wires, web barriers and/or inflatable cushions.

Takeoff and landing roll distances determine the minimum runway lengths required to operate a FWAV. These infrastructure requirements impose restrictions on FWAV design, performance and operations.

In contrast, a Vertical Take Off and Landing (VTOL) aircraft is capable of sustaining flight using rotors or jet thrusters, without depending on airspeed and the shape of the wings to create lift.

VTOL aircraft that depend on rotors for stationary and translation flight, such as helicopters, are called rotary wing aircraft.

Some VTOL aircraft use downward vectoring engine thrust to perform VTOL, and once they are airborne, engine thrust is vectored to provide forward impulse, while fixed wings provide lift. This approach requires complex mechanical and control systems.

As a general rule, a VTOL-capable aircraft is slower and has less endurance and range than a FWAV for a given useful load capacity.

However, the reduced performance of a VTOL aircraft is sometimes preferred due the ability to operate a VTOL aircraft in limited spaces, independent from a runway.

SUMMARY

The present disclosure relates to a modular nacelle system, which can allow a FWAV to perform Vertical Takeoff and Landing (VTOL) operations from constrained spaces, such as helipads and other constrained spaces. In particular embodiments, the FWAV can be converted back to its initial configuration by removing the nacelle system. Accordingly, the nacelle system can permit an aircraft to be changed back and forth between a purely fixed wing configuration and a VTOL configuration.

Systems in accordance with the presently disclosed technology can include two nacelles, with each nacelle associated with a wing of the FWAV. The nacelles can accommodate electric motors, which can be used to drive lift propellers that enable the FWAV to fly and maneuver as required to perform vertical takeoffs and landings.

The nacelles can also be used to carry other equipment (e.g., equipment usable for operation of the electric motors, such as batteries and controllers), while other internal space within the nacelles can be used to carry a useful load, e.g., a payload.

DETAILED DESCRIPTION

Figure 1:
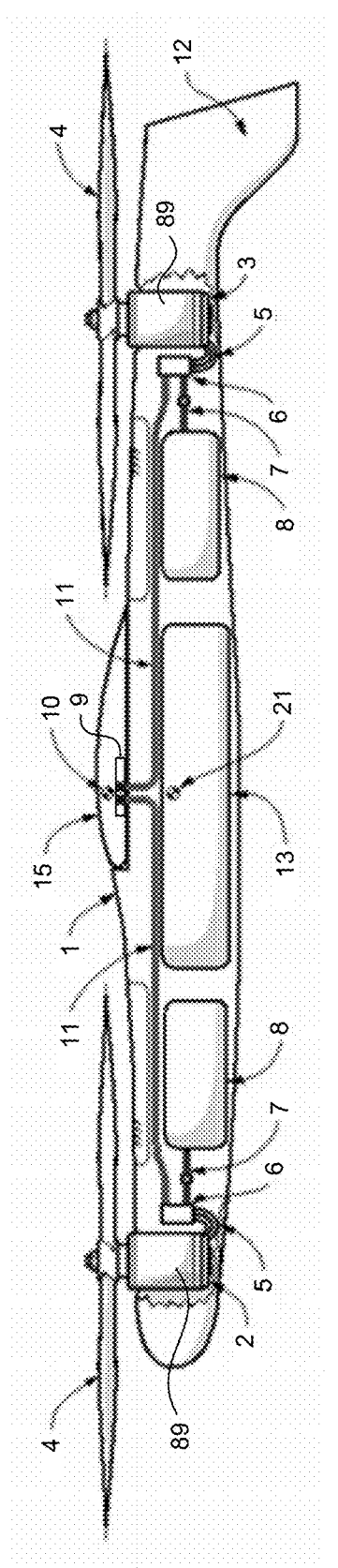
FIG. 1 is a partially cutaway illustration of a single nacelle showing the distribution of internal components including motors, batteries, fuel tank, motor controllers and electric connections, in accordance with an embodiment of the present technology.

Embodiments of the present technology include modular nacelle systems, suitable for installation on a FWUAV (Fixed Wing Unmanned Aerial Vehicle) and/or a FWMAV (Fixed Wing Manned Aerial Vehicle). As used herein in the context of the disclosed nacelles, "modular" means that the nacelles can be readily added or retrofitted to an existing fixed wing configuration, e.g. a fixed wing configuration that is configured for take-off, landing and horizontal flight without the nacelles. FIG. 1 depicts an embodiment of a single, aerodynamically shaped nacelle 1, which carries two firmly attached electric motors, one motor 89 near the front end 2 of the nacelle 1 and another motor 89 near the rear end 3. Each motor 89 drives a propeller or rotor 4 (e.g., a lift rotor) and is connected by a first electric coupling 5 (e.g., a first harness) to an electronic speed control module 6 that receives energy from a battery pack 8 via a second electric coupling 7 (e.g., a second electric harness). Accordingly, the battery pack 8 provides a power source for the motors 89 and other systems in the nacelle 1.

The electronic speed control modules 6 can receive control signals from a flight control system 9, e.g., located near the aircraft center of gravity 10, through a signal link 11 (e.g., a signal harness). The rear end 3 of the nacelle 1 can be shaped to form a vertical fin 12 to provide enhanced yaw stability.

The nacelle 1 can be attached to a wing 15 of a fixed-wing aircraft, such that a center of gravity 21 of the nacelle alone aligns with the center of gravity 10 of the aircraft, as will be described in further detail later. Unoccupied space in a central zone of the nacelle 1 can be used to carry a useful load, for example, sensors, cameras and/or a fuel tank 13.

Figure 2A:
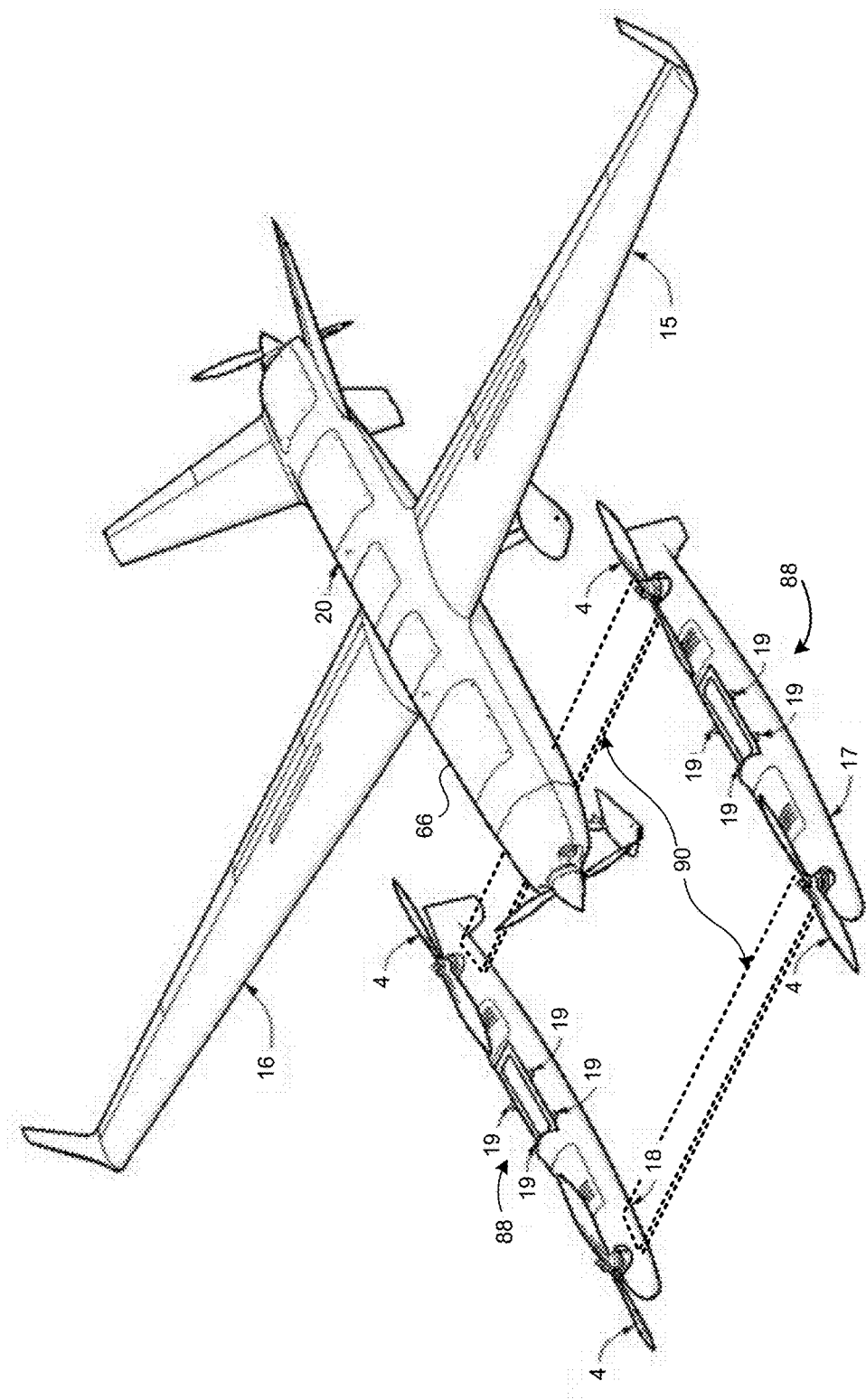
FIG. 2A illustrates a fixed wing UAV with a twin-nacelle system detached, in accordance with an embodiment of the present technology.

As shown in FIG. 2A, in a particular embodiment, two nacelles, each configured generally as described above, can be used to transform or reconfigure an aircraft 20 (e.g., a FWUAV) into a VTOL-capable aircraft by attaching a first nacelle 17 beneath the left wing 15 of the aircraft 20 and a second nacelle 18 beneath the right wing 16. The wings 15, 16 are attached to a fuselage 66 which can house motors, control systems, payloads and/or other systems and devices. The nacelles 17, 18 can be independent or connected with a structural connection device 90, described in further detail later. Nacelles 17, 18 can be identical or nearly identical, for example, if they are configured to attach to wings having a constant chord, or at least a constant chord at the attachment site. In other embodiments, nacelles 17, 18 can be individually configured to attach to a left wing or a right wing, respectively. Nacelles of various types can be configured to attach to a corresponding variety of aircraft. To provide a secure attachment, a mechanical attachment device 88 (e.g., one or more brackets 19), can be used to fix the nacelles 17, 18 to the wings 15, 16, as described further below with reference to FIGS. 2B-2E.

In particular embodiments, the nacelles 17, 18 are releasably coupled to the corresponding wings 15, 16. As used herein, the term "releasably" and "removably" in the context of nacelles means that the nacelles can be removed as part of a routine operation for converting the aircraft 20 back from a VTOL-capable aircraft to a non-VTOL-capable aircraft. Accordingly, the nacelles are configured differently than are nacelles for conventional aircraft, which may be removed, but typically for purposes other than converting between VTOL and non-VTOL configurations. In particular, such conventional nacelles may be removed for maintenance, repairs and/or replacement. Unlike such conventional nacelles, nacelles in accordance with the present technology can be deliberately configured to be removed and re-attached multiple times to convert the aircraft. Accordingly, the nacelles are simpler and faster to remove and re-attach than are conventional nacelles.

Figure 2B:
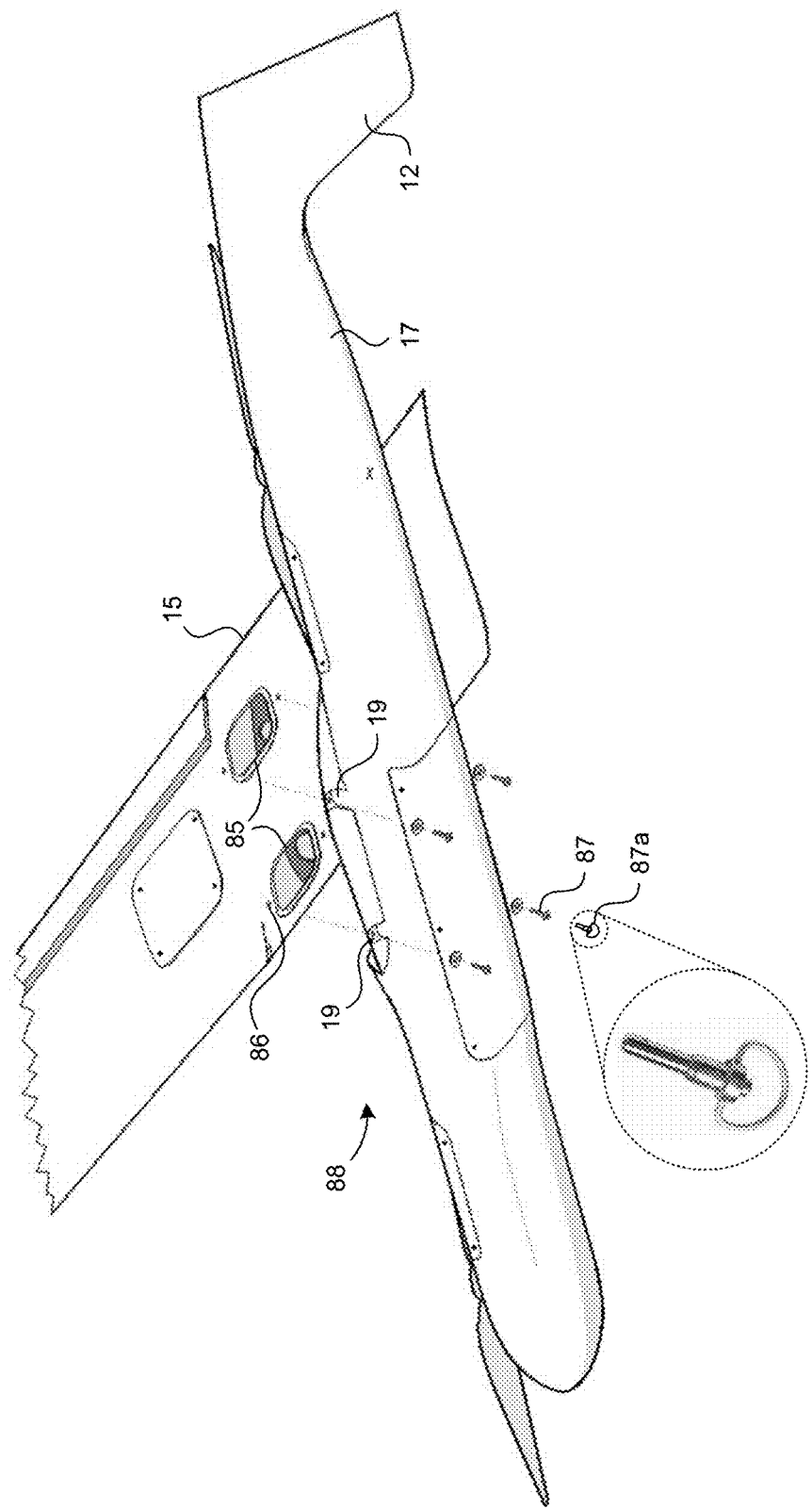
FIGS. 2B-2E illustrate a representative arrangement for attaching a modular nacelle to a wing, in accordance with an embodiment to the present technology.

FIG. 2B illustrates a nacelle 17 positioned for attachment to a corresponding wing 15. The brackets 19 are aligned with the underside of the wing 15, and, in particular, aligned with nuts or nut plates 86 carried by the wing 15. The wing 15 can include one or more access openings 85 positioned to align with the nacelle 17, for example, to allow signal communication lines and/or other hardware (e.g., fuel lines, if the nacelle is carrying an auxiliary fuel tank) to extend between the wing 15 and the nacelle 17. Bolts 87 or other attachment elements are then positioned to attach the brackets 19 to the nut or nut plate 86. Other representative elements include a quick release pin 87a (that can be used in lieu of the bolt 87 and nut plate 86), and/or other suitable structures.

Figure 2C:
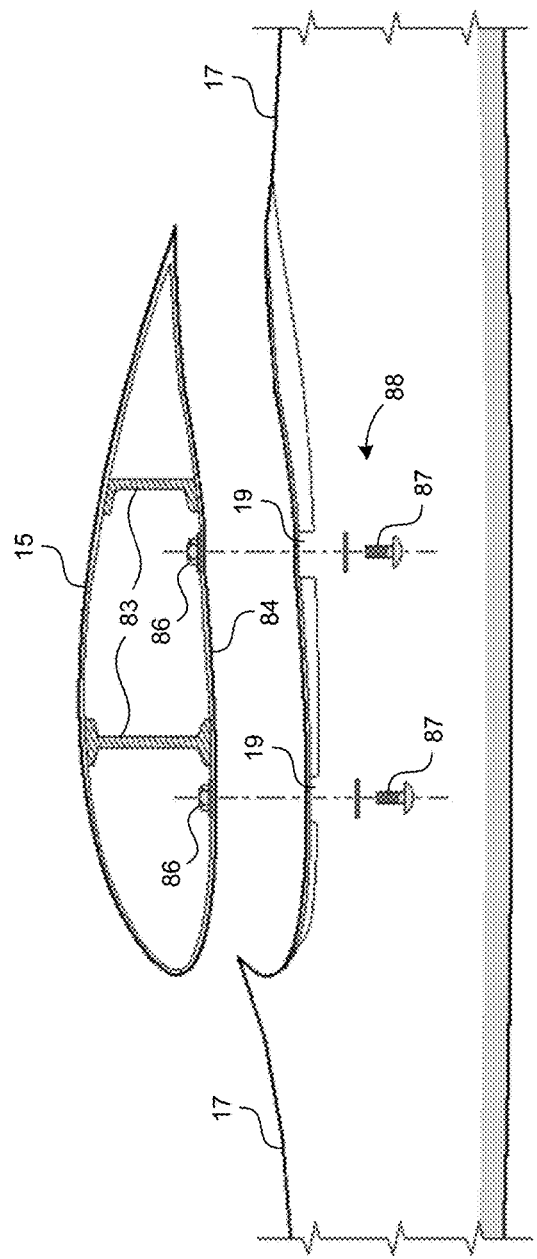

FIG. 2C is a partially schematic, cross-sectional illustration of the attachment arrangement shown in FIG. 2B. In a particular embodiment, the nut or nut plate 86 can be housed or carried by the skin 84 of the wing 15. In other embodiments, the bolts 87 and/or other attachment hardware can be connected to the wing spar 83 or other internal structural members of the wing 15. For example, the nacelle 17 can be attached to strong points of the wing 15, which may be configured to carry other external hardware (e.g., fuel tanks).

Figure 2D:
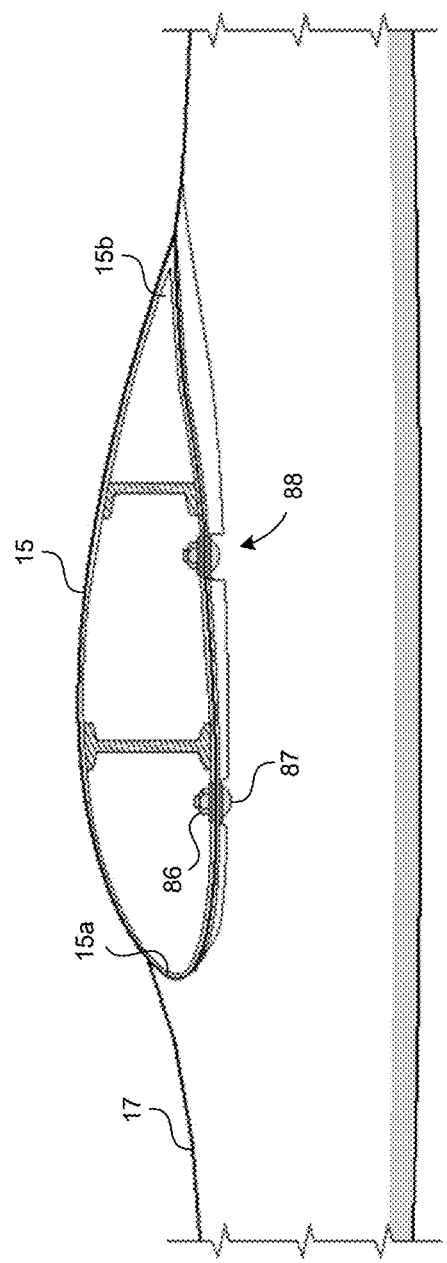

FIG. 2D illustrates the nacelle 17 after it has been attached to the wing 15. As shown in FIG. 2D, the upper surface of the nacelle 17 can be contoured so as to provide a smooth transition to a leading edge 15a of the wing 15, and a trailing edge 15b of the wing 15. Accordingly, the aerodynamic impact of the nacelle 17 on the wing 15 can be reduced.

Figure 2E:
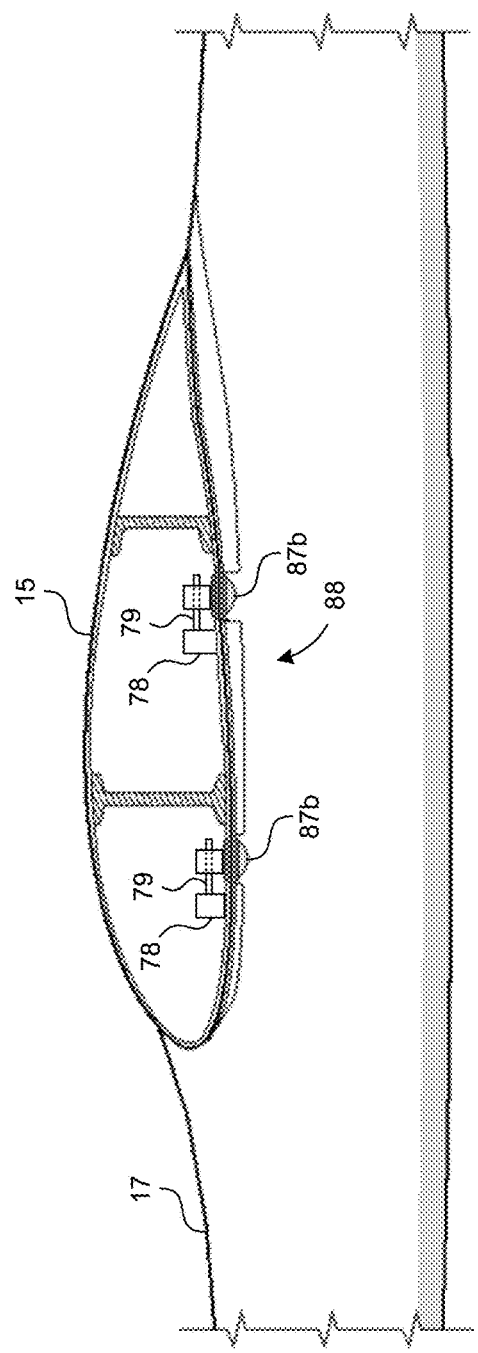

FIG. 2E illustrates a nacelle 17 connected to the wing 15 via a mechanical attachment device 88 configured in accordance with another embodiment of the present technology. In one aspect of this embodiment, the attachment arrangement includes bolts 87b having transverse internal passages, which receive corresponding pins 79 driven by corresponding actuators 78. When the nacelle 17 is attached to the wing 15, the actuators 78 extend the pins 79 into the bolts 87b, and when the nacelle 17 is detached from the wing 15, the actuators 78 retract the pins 79. This arrangement can be used to remotely detach the nacelle 17 from the wing 15 (e.g., in flight), as is discussed in greater detail later.

Figure 3:
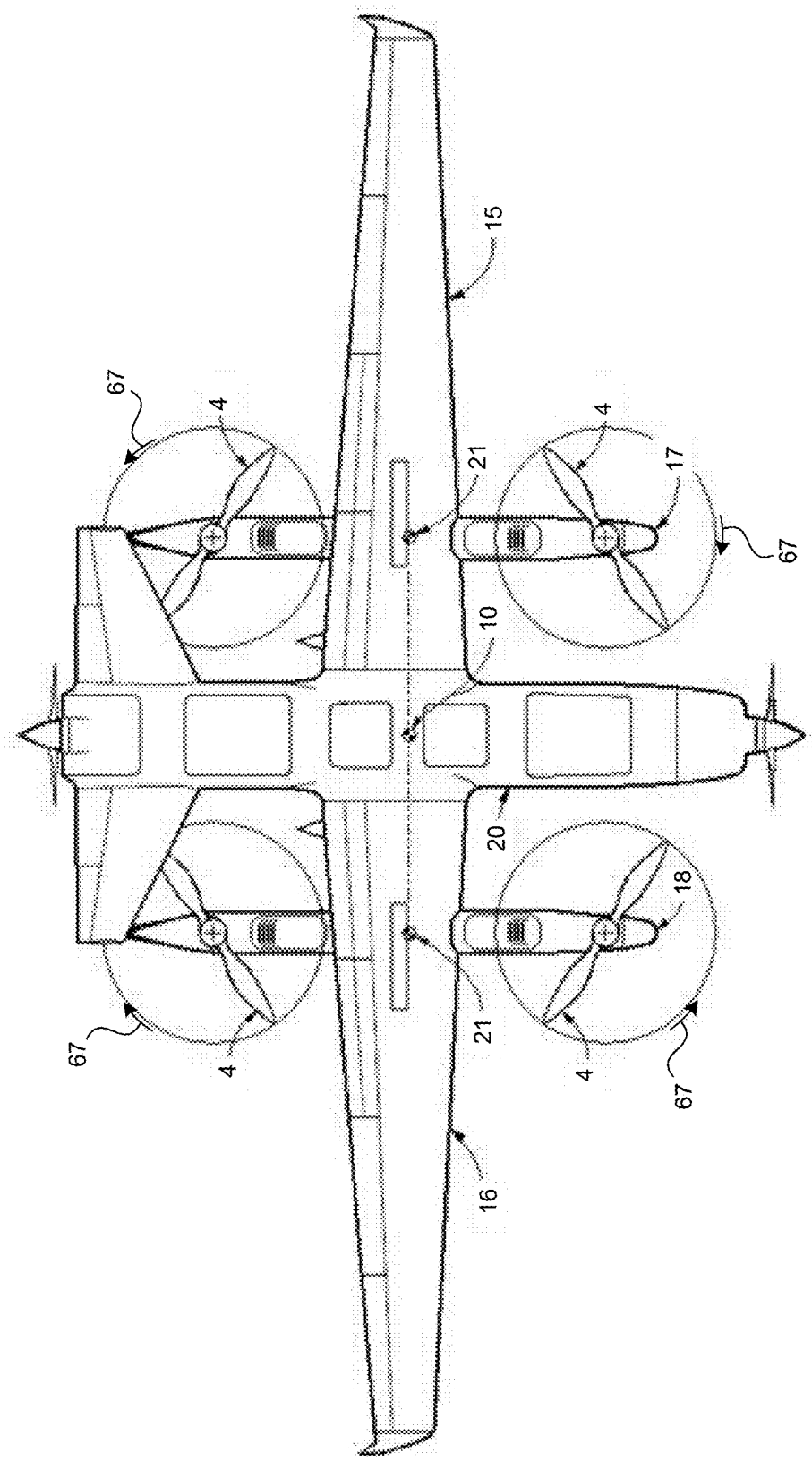
FIG. 3 illustrates a plan view of a fixed wing UAV with a VTOL nacelle system attached under the wings, in accordance with an embodiment of the present technology.

Referring next to FIG. 3, each nacelle center of gravity 21 can be longitudinally aligned with the aircraft center of gravity 10 to maintain the balance of the aircraft. Accordingly, the longitudinal position of the aircraft center of gravity 10 does not change (or changes by an acceptable amount) when the nacelles 17, 18 are attached or detached. To create lift for vertical takeoff, the four nacelle motors 2, 3 (FIG. 1) can accelerate the corresponding rotors 4. To facilitate stability, the propellers of each nacelle 17, 18 can be rotated in opposite directions 67.

Figure 4:
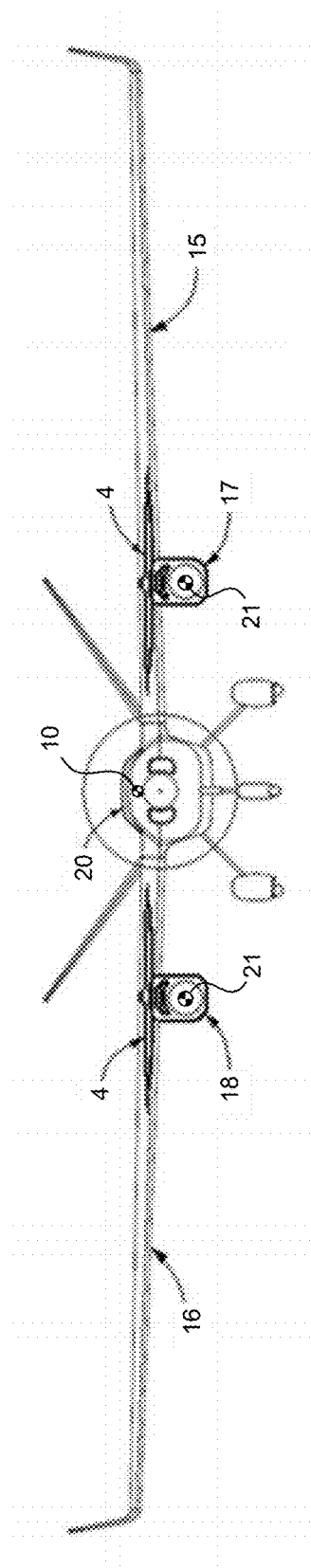
FIG. 4 illustrates a front view of a fixed wing UAV with a VTOL nacelle system attached under the wings, in accordance with an embodiment of the present technology.
Figure 5:
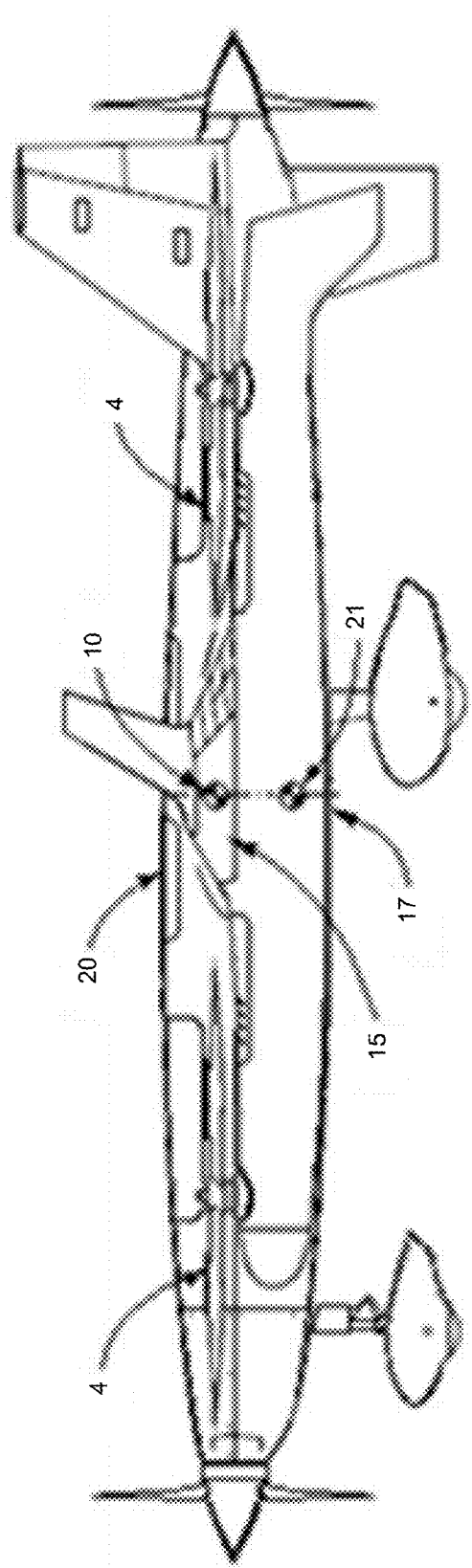
FIG. 5 illustrates a side view of a fixed wing UAV with a VTOL nacelle system attached under the wings, in accordance with an embodiment of the present technology.

FIGS. 4 and 5 are front and side views, respectively, of the aircraft 20 shown in FIG. 3. These figures illustrate that the aircraft center of gravity 10 and the nacelle centers of gravity 21 may have different locations in the vertical and lateral directions, but are aligned longitudinally to be at the same or nearly the same station location. Accordingly, the center of gravity of the aircraft 20 will likely shift in the vertical direction when the nacelles 17, 18 are attached but will not shift (or will not shift significantly) in the longitudinal direction (because the aircraft and nacelle centers of gravity are longitudinally aligned), or in the lateral direction (because the nacelles 17, 18 are attached symmetrically with respect to the aircraft 20). As used herein, the term "longitudinally aligned" refers to an alignment that is within 1% of the longitudinal distance between the rotor motors 89 (FIG. 1), or within 3% of the wing chord (e.g., the chord at the wing location where the nacelles are attached).

Figure 6:
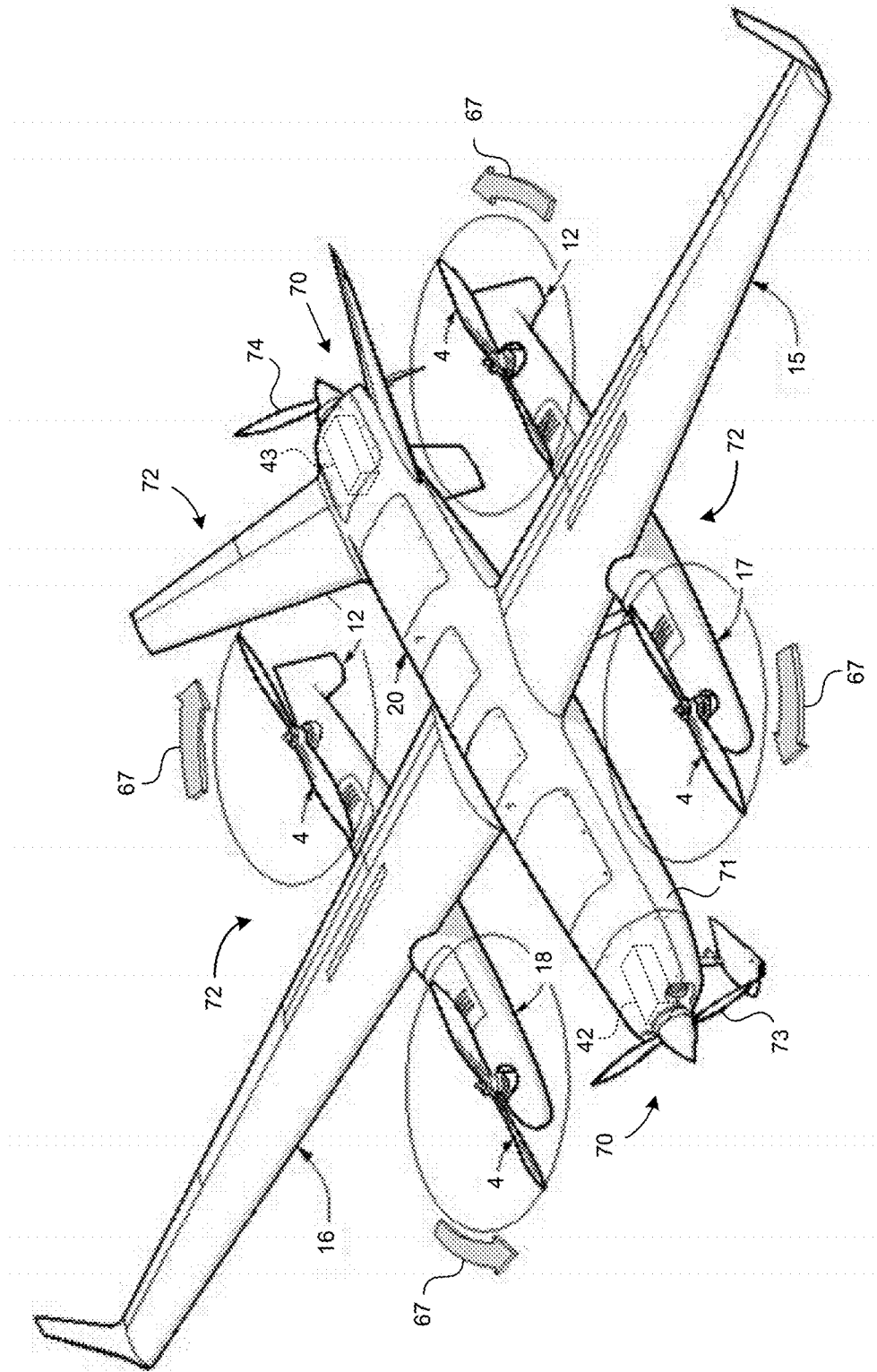
FIG. 6 shows an isometric view of a fixed wing UAV with a VTOL nacelle system attached under the wings, in accordance with an embodiment of the present technology.

FIG. 6 illustrates the aircraft 20 of FIG. 2 with the nacelles 17, 18 attached. As shown in FIG. 6, the aircraft effectively has two propulsion systems: a first propulsion system 70 that is carried by the fuselage 71 of the aircraft 20, and a second propulsion system 72 that is carried by the nacelles 17, 18. The first propulsion system 70 is generally fixed to the aircraft 20, while the second propulsion system 72 is modular and can be readily attached (and, in several embodiments, removed) to convert between non-VTOL and VTOL configurations. The first propulsion system 70 can include one or more propellers (e.g., one or both of a tractor propeller 73 and a pusher propeller 74). In other embodiments, the first propulsion system 70 can include other propulsive devices, e.g., jet engines, and/or can be carried by other portions of the aircraft 20 (e.g., the wings 15, 16). The first propulsion system 70 can use conventional aviation fuels, battery power and/or other energy sources to drive the propellers or other propulsive devices via corresponding motors or engines 42, 43.

Figure 7:
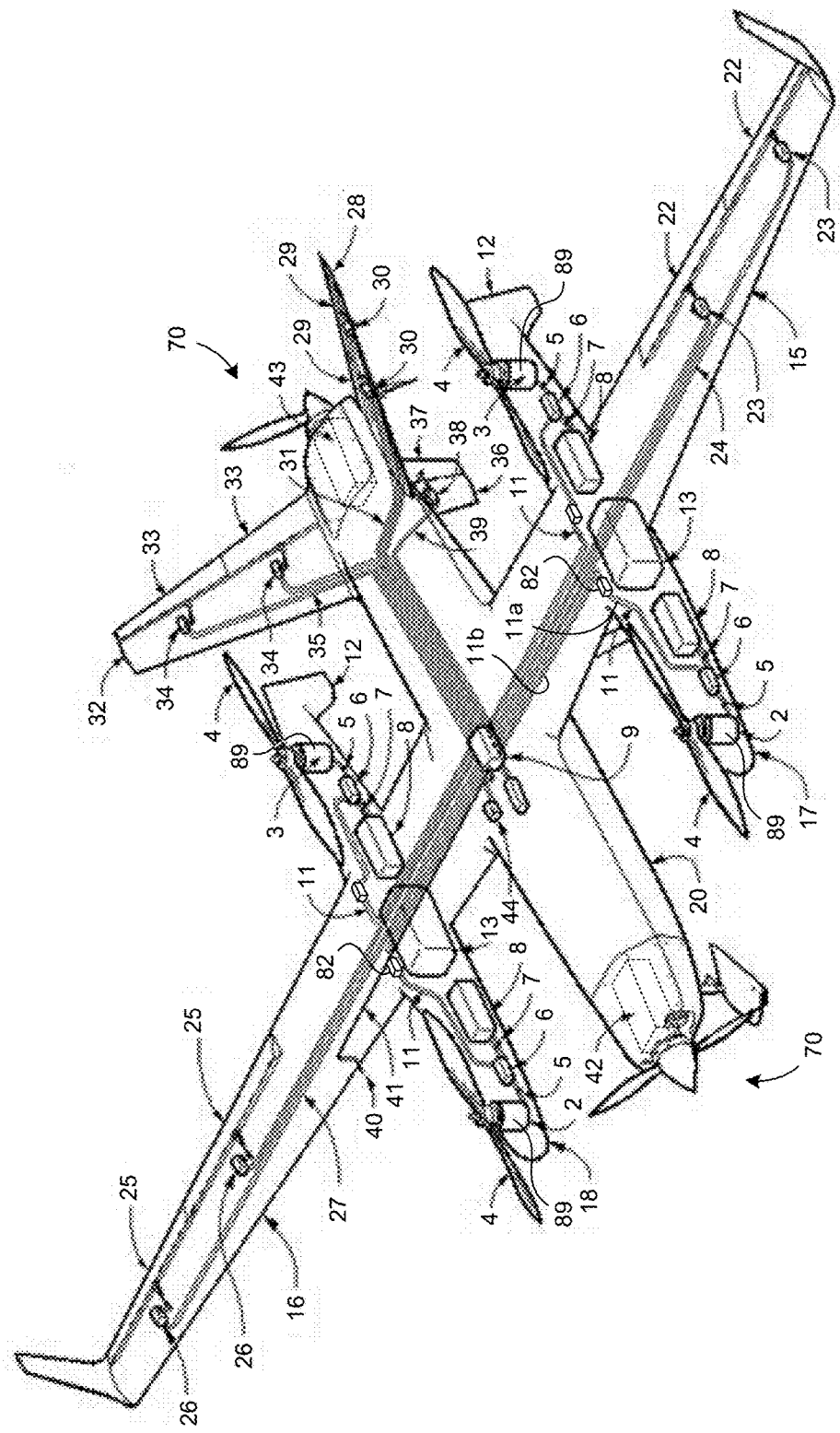
FIG. 7 illustrates a partially cutaway view of a fixed wing UAV with a VTOL nacelle system attached under the wings, showing several internal components including motors, batteries, fuel tank, motor controllers and electric connections, in accordance with an embodiment of the present technology.

Referring now to FIG. 7, the aircraft 20 can achieve attitude and dynamic control using a differential control speed motor, commanded by the flight control system 9, which can use on-board accelerometers to determine the attitude of the aircraft 20, and other on-board sensors, such as a dynamic pressure probe 40, connected by a line 41, to calculate air speed. The aircraft 20 can also include a Global Position System (GPS) receiver 44 to determine the position and ground speed of the aircraft. Once the aircraft 20 is airborne and reaches a target altitude, the aircraft engines 42, 43 can be used to accelerate the aircraft, increasing the aircraft airspeed above the minimum required to maintain level flight (e.g., the stall speed), such that the lift generated by the wings 15, 16 is sufficient to maintain the altitude of the aircraft 20. When the aircraft 20 has achieved stable forward flight, the nacelle motors 89 can be shut off, the propellers 4 aligned with the nacelles 17, 18 (as shown in FIG. 7), and the aircraft 20 can continue flight in the manner of a fixed wing aircraft.

During the fixed wing flight stage, control can be achieved using conventional control systems, common to manned and/or unmanned air vehicles. For example, roll control can be achieved by differential movement of left and right ailerons 22, 25, activated by corresponding control mechanisms 23, 26 which are connected to the flight control system 9 through corresponding control harnesses 24, 27.

Pitch and yaw stability can be achieved via tail surfaces. For example, the aircraft 20 shown in FIGS. 2A-7 and 9 have left and right V-tail surfaces 28, 32 and a vertical stabilizer surface 36. Movable elevator surfaces 29, 33 on the left and right V-tails 28, 32, respectively can be actuated by corresponding mechanical devices 30, 34 respectively. The control mechanisms can in turn commanded by the flight control system 9, to which they are connected by a corresponding control link (e.g., harnesses 31, 35).

The depicted vertical stabilizer surface 36 can carry a movable rudder surface 37, actuated by a control device 38 connected by a control link (e.g., a harness 39) to the flight control system 9.

Connections between the nacelles 17, 18 and the wings 15, 16 can be simple and easy to use, both for attachment and detachment. For example, as described above with reference to FIGS. 2B-2E, the mechanical connections between the nacelles 17, 18 and the corresponding wings 15, 16 can be straightforward and easy to implement. Other connections, for example, electrical connections, can also be easy to implement. For example, the signal links 11 between the nacelles and the wing can include a first portion 11a carried by the nacelle, a second portion 11b carried by the wing, and can be connected with a quick-release connector 82.

To perform a vertical landing, the aircraft can initially approach the landing zone in the manner of a fixed wing vehicle. Once the landing point is within gliding distance, the first propulsion system 70 (e.g., the engines 42 and 43) can be shut off or idled, and the speed of the aircraft can be reduced. When the speed approaches the minimum speed required to sustain level flight (e.g., the stall speed), the nacelle motors 89 can be actuated, to maintain the flight/altitude. As the speed is further reduced, more lift is generated by the nacelle motors 89 and less by the wings 15, 16, until the aircraft 20 is hovering just above the landing zone. Then, the power applied to the nacelle motors 89 can be gradually reduced until the aircraft 20 touches the ground or other landing surface. Further details of representative takeoff and landing operations are described later with reference to FIGS. 14A-14D.

Figure 8:
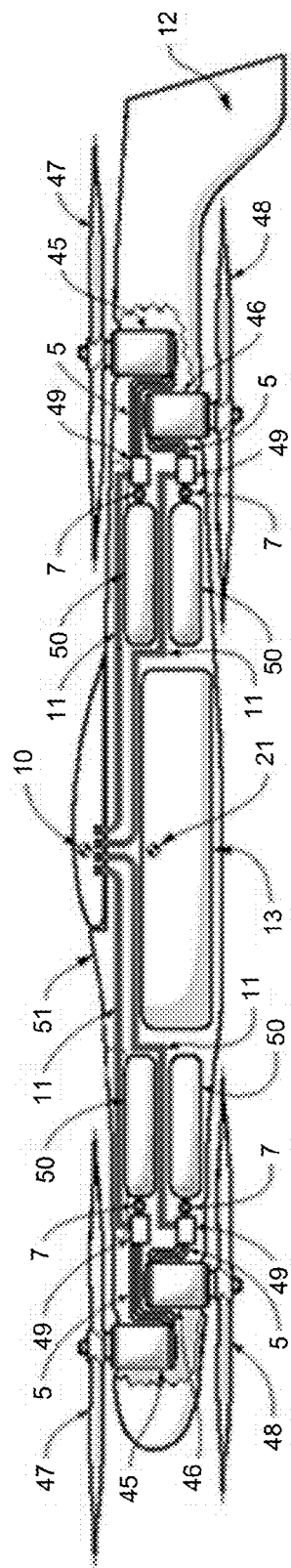
FIG. 8 is a partially cutaway illustration of a single nacelle having redundant systems, in accordance with an embodiment of the present technology.

FIG. 8 illustrates a nacelle 51 having a redundant motor configuration, in accordance with an embodiment of the present technology. The redundant features of the configuration can increase system reliability. For example, the configuration can include two motors installed on each end of the nacelle 51, with one motor 45 pointing upward and another motor 46 pointing downward, and with each motor coupled to a corresponding propeller 47, 48. Each motor can be controlled by a respective controller 49 and powered by an independent battery pack 50, to provide still further redundancy.

Figure 9:
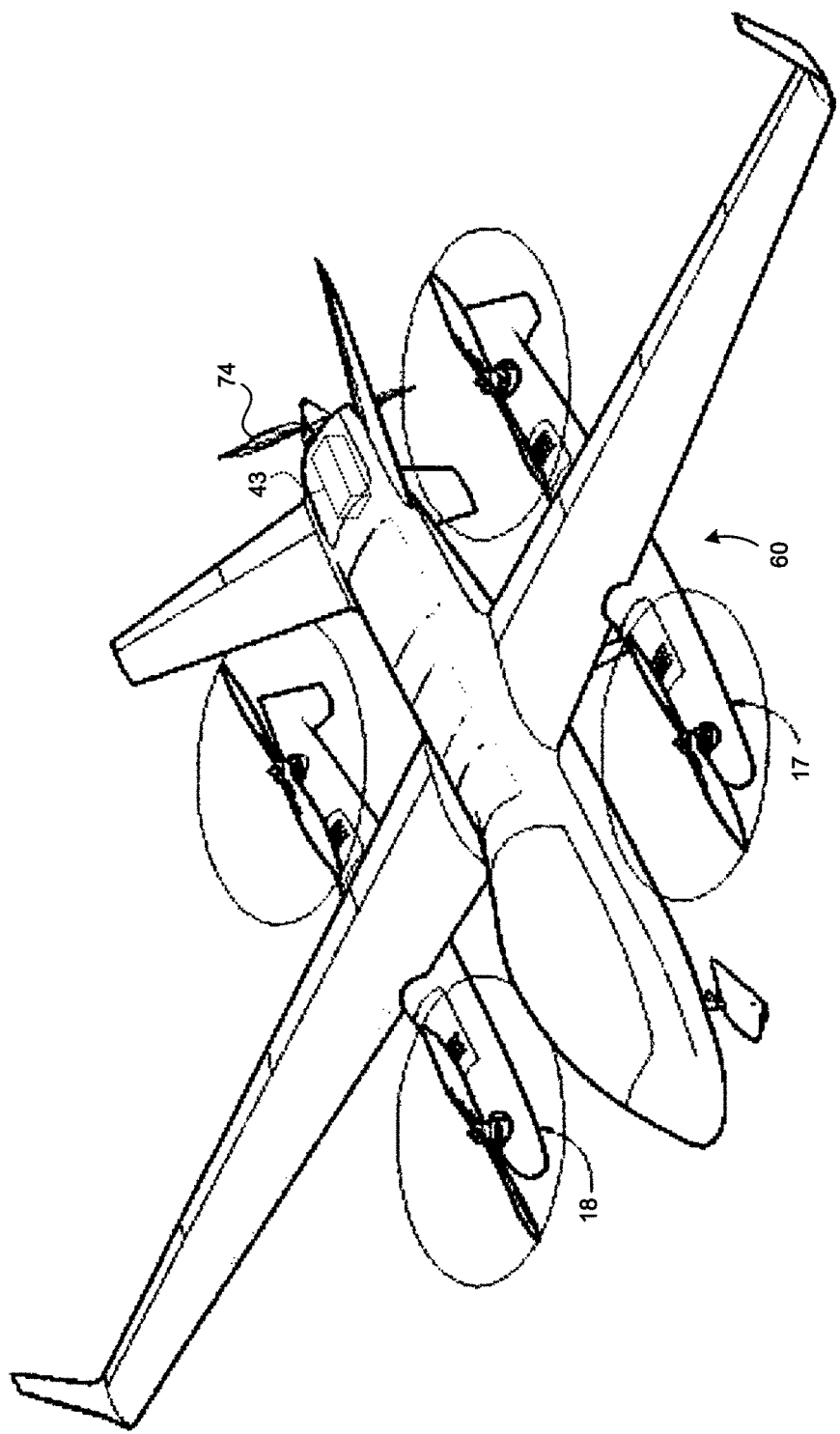
FIG. 9 illustrates a fixed wing, single engine, V-tail aircraft with a mounted nacelle system for vertical takeoff and landing, in accordance with an embodiment of the present technology.
Figure 10:
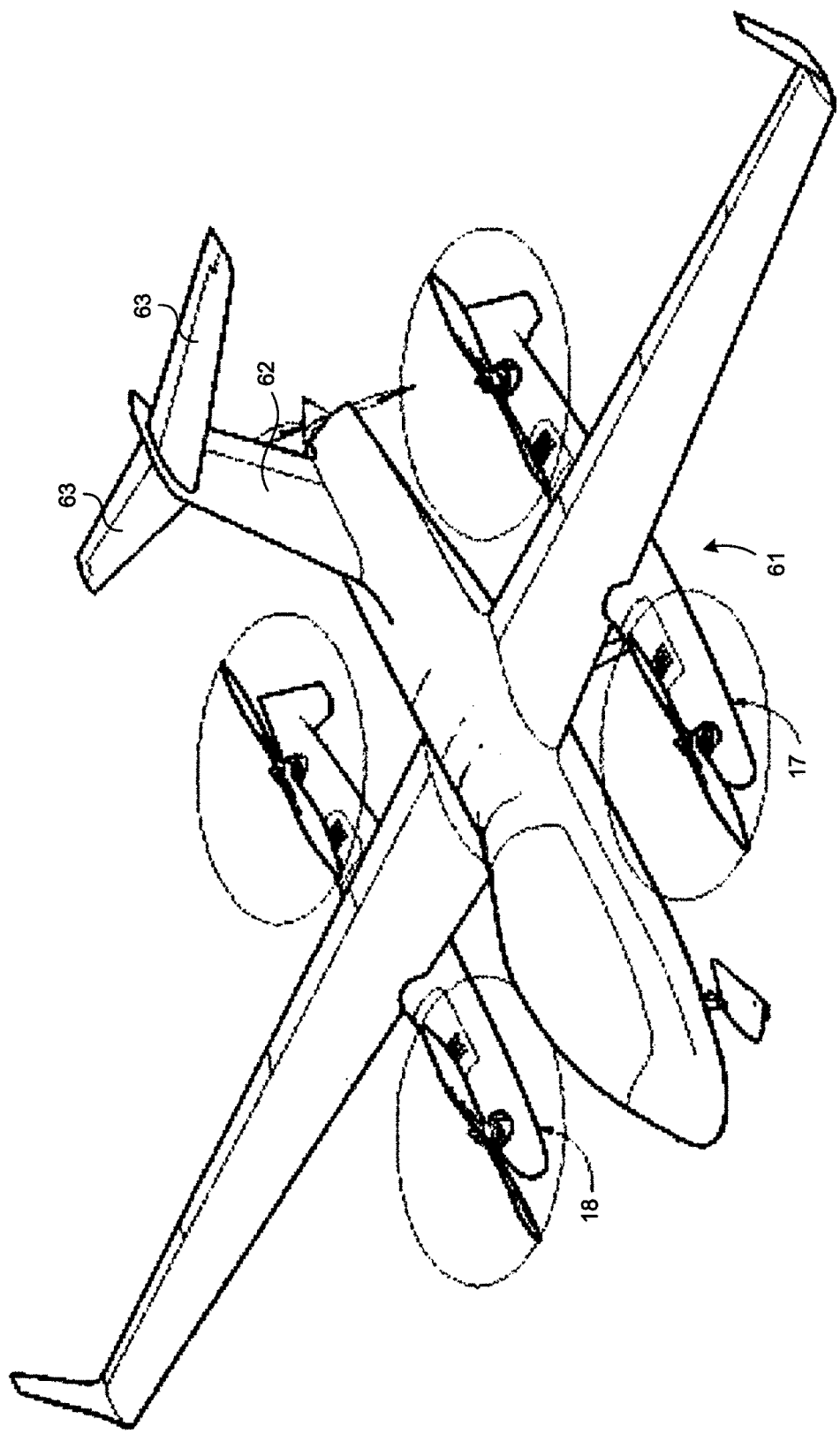
FIG. 10 illustrates a single engine, T-tail aircraft with a nacelle system mounted for vertical takeoff and landing, in accordance with an embodiment of the present technology.
Figure 11:
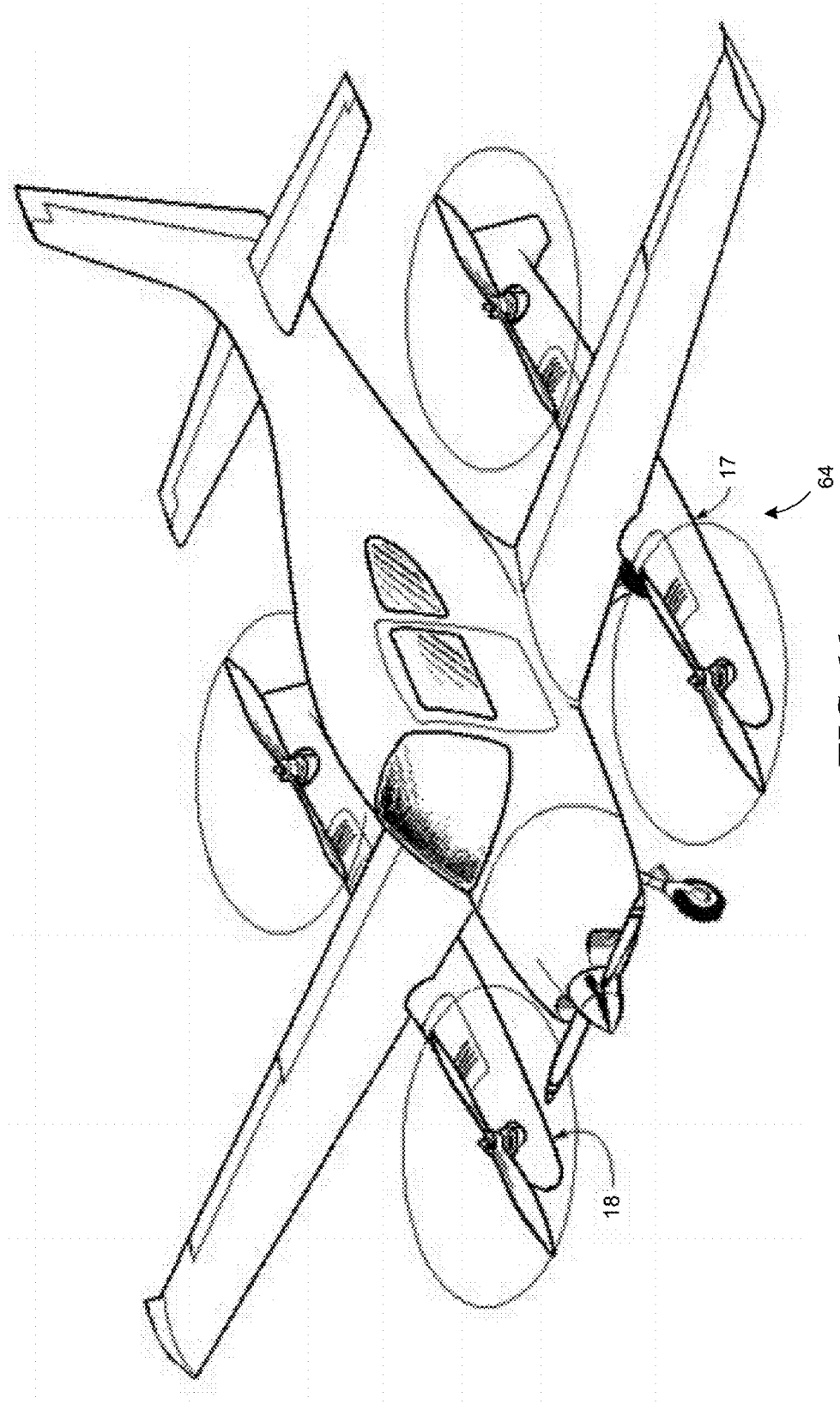
FIG. 11 illustrates a general aviation single engine, low-wing aircraft, with a nacelle system mounted for vertical takeoff and landing capabilities, in accordance with an embodiment of the present technology.
Figure 12:
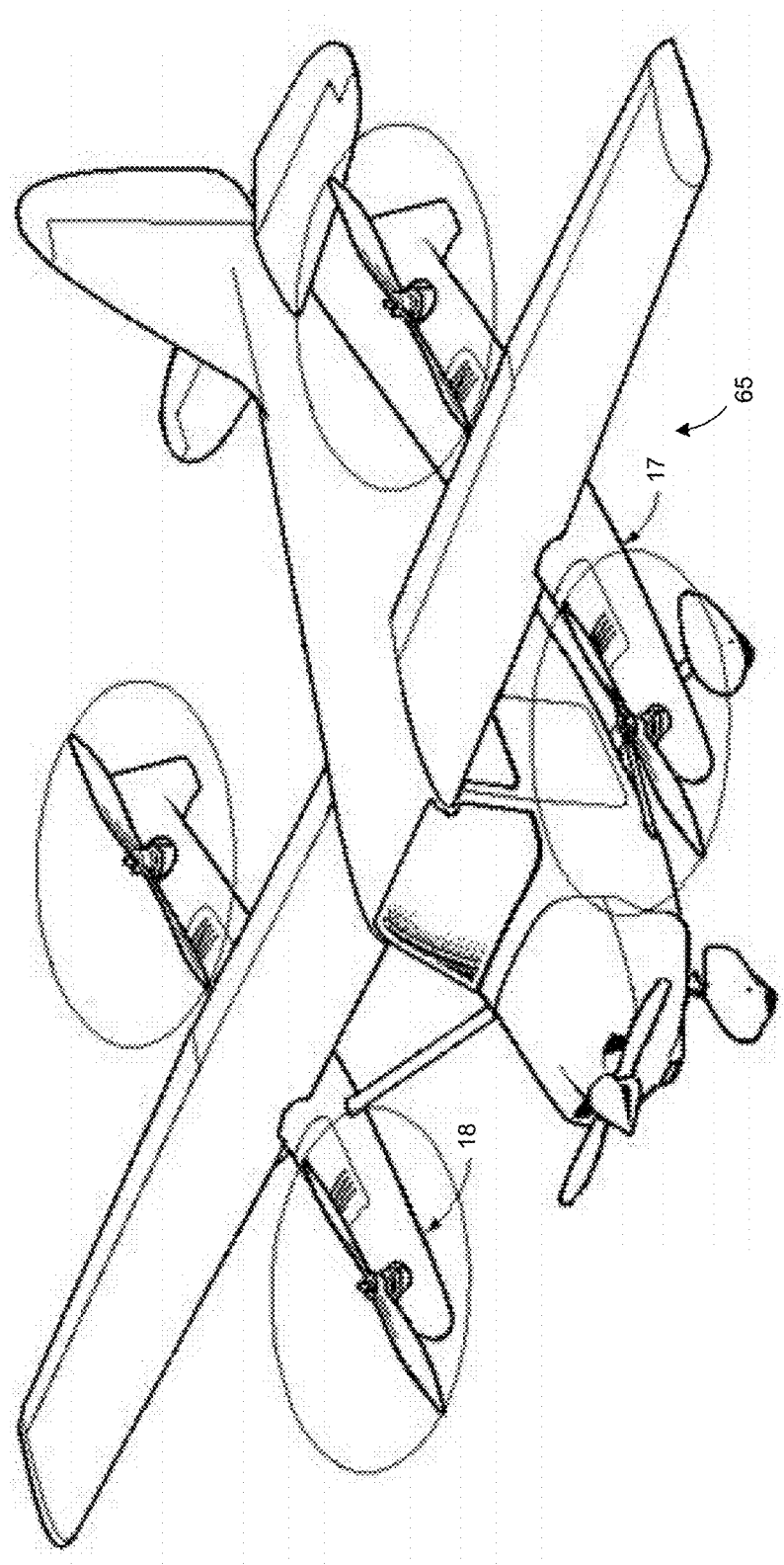
FIG. 12 illustrates a general aviation single engine, high-wing manned aerial vehicle, with a mounted nacelle system to provide the aerial vehicle with vertical takeoff and landing capabilities, in accordance with embodiments of the present technology.

Nacelles having configurations the same as or generally similar to those described above can be attached (and, in at least some embodiments, removably attached) to aircraft having a variety of different configurations. For example, FIG. 9 illustrates the nacelles 17, 18 attached to a single engine, V-tail aircraft 60 having a single engine 43 driving a pusher propeller 74. FIG. 10 illustrates the nacelles 17, 18 attached to an aircraft 61 having a T-tail configuration, with an upwardly extending vertical stabilizer 62 and laterally extending horizontal stabilizers 63. FIG. 11 illustrates the nacelles 17, 18 attached to an aircraft 64 having a low-wing configuration, and FIG. 12 illustrates the nacelles 17, 18 attached to an aircraft 65 having a high-wing configuration. The general principles and techniques described above for attaching, integrating and removing the nacelles can be applied to any of the foregoing configurations, with adjustments that may be implemented to accommodate particular wing configurations and/or other configuration-specific details.

Any of the foregoing configurations can include a system that converts the pilot's control inputs to electric signals, which are received by the electronic control system 6 to control the aircraft during the vertical flight stages.

Figure 13:
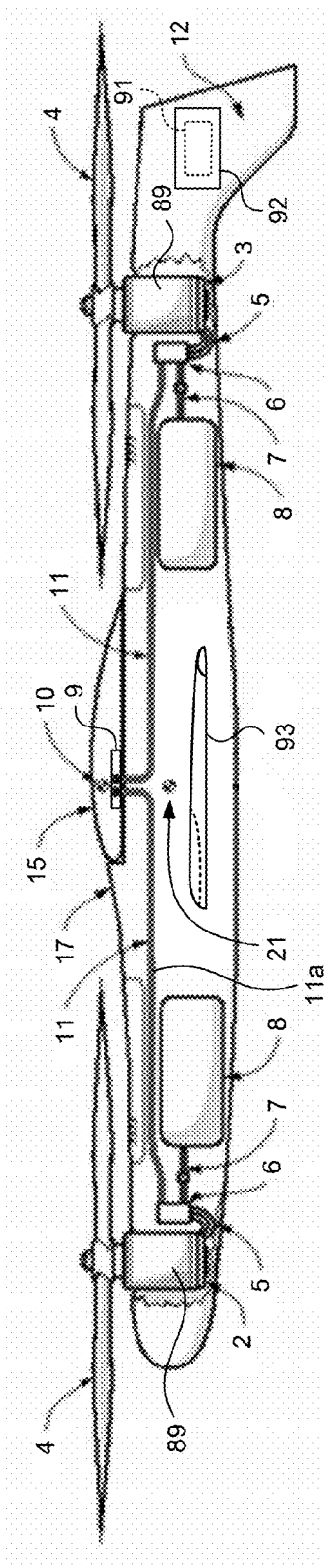
FIG. 13 illustrates a nacelle system having multiple speed reduction devices configured in accordance with embodiments of the present technology.

In at least some embodiments, the nacelles 17,18 are attached to and detached from the aircraft 20 on the ground, allowing the aircraft to have a dual fixed wing and VTOL configuration when attached, and a fixed wing only configuration when detached. In other embodiments, the nacelles 17, 18 can be ejected, jettisoned or otherwise disconnected from the aircraft 20 while the aircraft 20 is aloft. For example, in some embodiments, the nacelles 17, 18 can be ejected and discarded after the aircraft 20 has established a forward flight path. In other embodiments, the nacelles 17, 18 can be ejected and retrieved. For example, as shown in FIG. 13, a representative nacelle 17 can carry one or more in-flight speed reduction devices, e.g., one or more parachutes 91 (stowed behind an openable hatch 92) and/or deployable lifting surfaces 93 (e.g., wings or winglets) that are automatically deployed after the nacelle 17 has been ejected. Accordingly, the speed reduction devices can allow the nacelle to drift or glide back to the ground without being destroyed or significantly damaged. In still further embodiments, the nacelle 17 can use the propellers 4 to control decent and landing. For example, each nacelle can autonomously fly back to the launch site from which the aircraft 20 departed, or to another suitable landing site. In such an embodiment, the propellers 4 can rotate in opposite directions for increased stability, and winglets or other deployable or non-deployable surfaces can provide additional control, stability, and/or guidance.

In any of the foregoing embodiments, the nacelle and/or the aircraft can include a release mechanism (e.g., remotely operable) that disengages the nacelle from the aircraft in flight. For example, the release mechanism can include actuated pins, as described above with reference to FIG. 2E, that engage the nacelles 17, 18 with the corresponding wings 15, 16 during flight, and that disengage to release the nacelles. Any electrical connections, for example, the signal link 11 described above with reference to FIGS. 1 and 7, can also include an actuator that disconnects the connector 82 (FIG. 7) coupling first portion of the link 11a carried by the nacelle from the second portion of the link 11b (FIG. 7) carried by the aircraft. In a particular embodiment, the foregoing actuators controlling the mechanical connection between the nacelle and the aircraft are coordinated so as to release simultaneously, thus allowing the nacelles to smoothly move away from the corresponding wings. The electrical connections can release last, so that in case the mechanical connections remain intact (or partially intact), the functionality of the nacelle can still be controlled. In other embodiments, the actuators can be sequenced in other manners to facilitate this operation.

In yet another embodiment, the nacelles 17, 18 can be connected to each other, e.g., both when attached to the aircraft 20 and after being ejected from the aircraft 20. FIG. 2 schematically illustrates a structural connection device 90 configured in accordance with a particular embodiment. The connection device 90 can include one or more lightweight, aerodynamically-shaped beams that carry the nacelles 17, 18 in a generally fixed position relative to each other. The structural connection device 90 can be independent of the aircraft fuselage and/or wings to allow the nacelles to readily move away from the aircraft 20 once detached. When ejected, the connected nacelles 17, 18 can form a quadcopter that is autonomously guided to a landing site (e.g., the launch site or a different suitable site) without additional flight control or stabilizing surfaces.

An advantage of embodiments that include the retrievable features discussed above is that the features allow the nacelles 17, 18 to be used repeatedly, even after being ejected during flight. Conversely, an advantage of embodiments that include the disposable feature discussed above is that nacelles 17, 18 can be less expensive to manufacture for single-use missions. An advantage of embodiments in which the nacelles are removable or ejectable in flight is that the aircraft can carry the additional, second propulsion system for only as long as is necessary to take off vertically. For the rest of the aircraft mission, the first propulsion system (which can have better endurance and/or higher efficiency for horizontal travel) can be used exclusively.

Figure 14A:
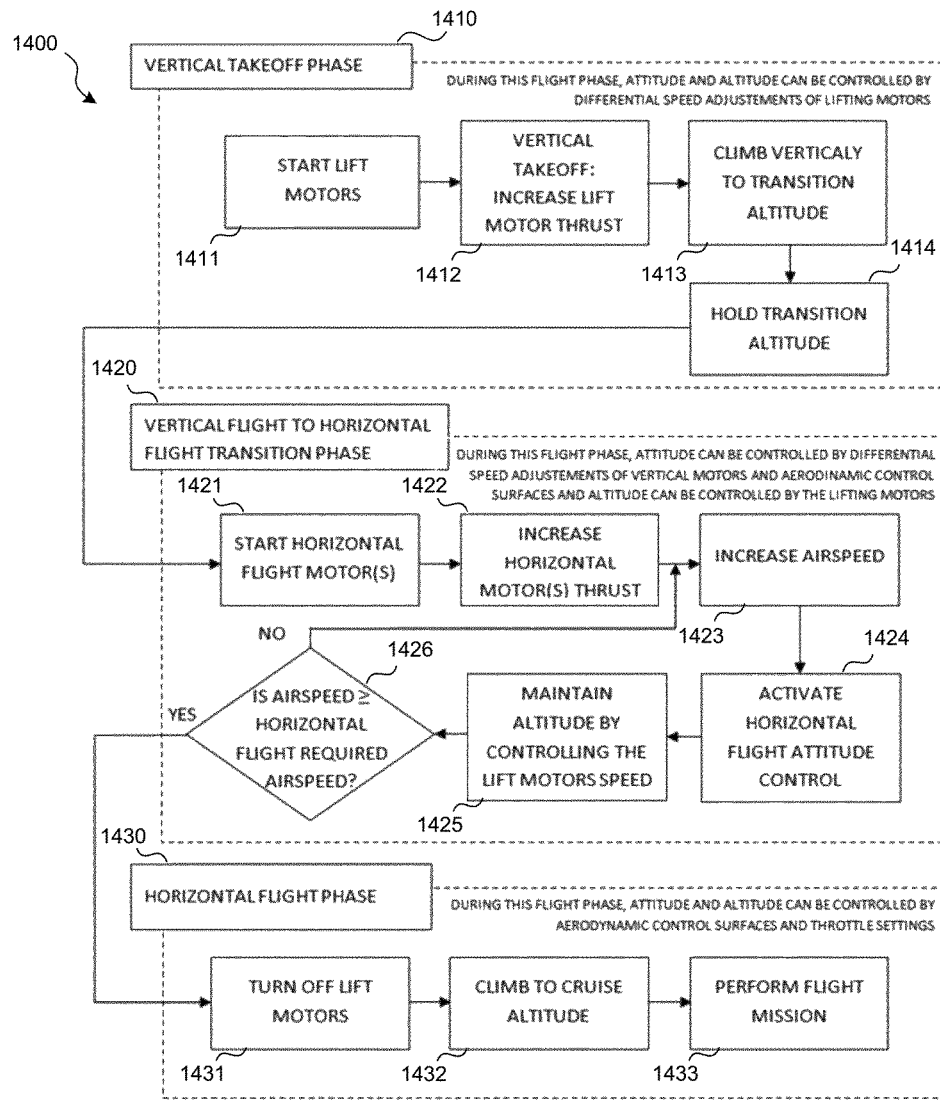
FIGS. 14A-14B illustrate a process for vertical takeoff and transition to horizontal flight, in accordance with an embodiment of the disclosure present technology.
Figure 14B:
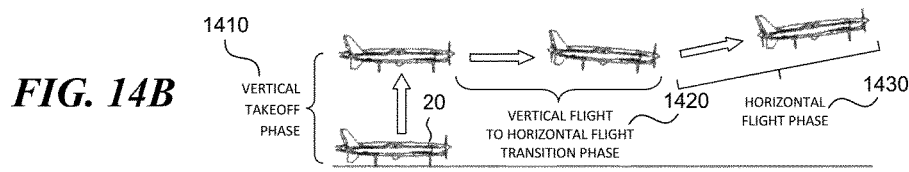
Figure 14C:
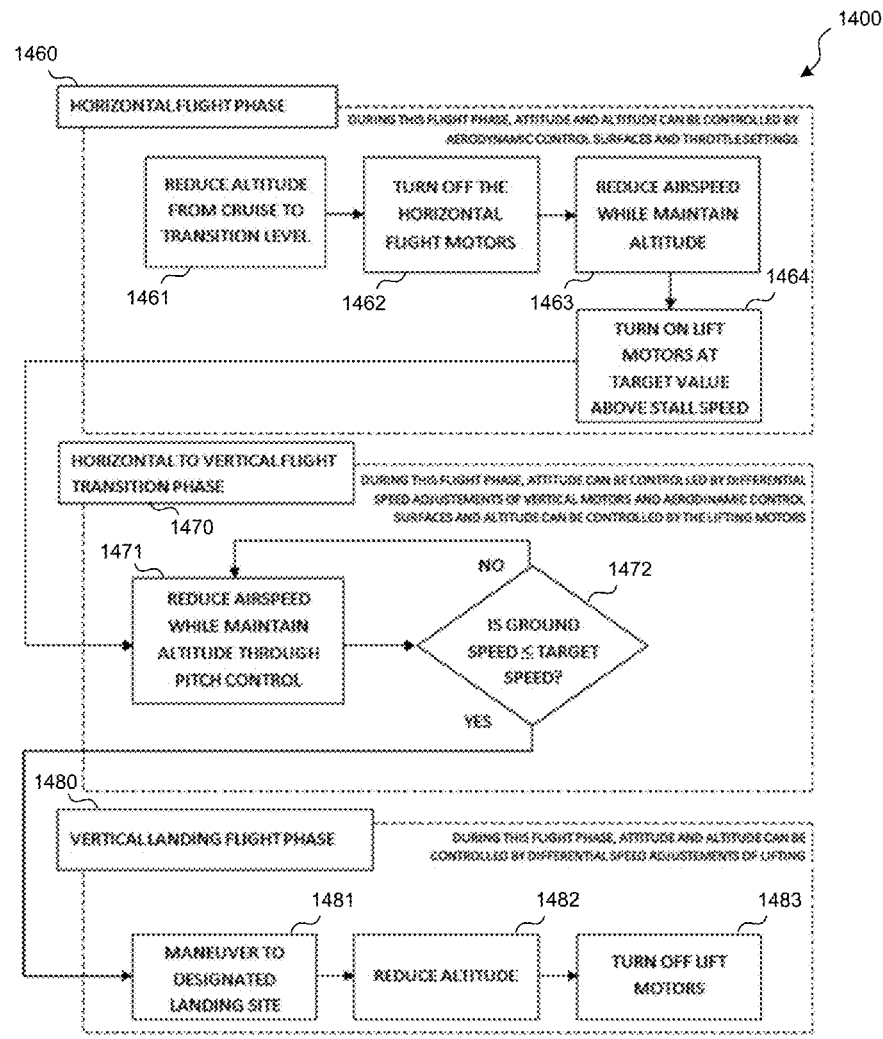
FIGS. 14C-14D illustrate a process for transition from horizontal flight to vertical flight and landing, in accordance with an embodiment of the present technology.
Figure 14D:
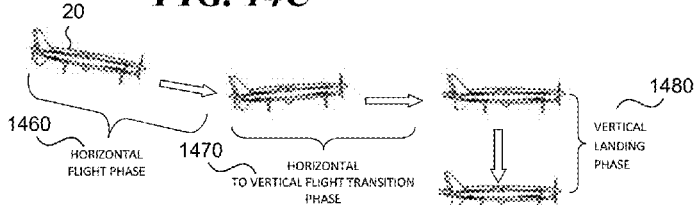

FIGS. 14A-14B illustrate a process for vertical takeoff and transition to horizontal flight, and FIGS. 14C-14D illustrate a process for transitioning from horizontal to vertical flight and conducting a vertical landing. Beginning with FIGS. 14A and 14B, an overall process 1400 includes a vertical takeoff phase 1410, a vertical flight to horizontal flight transition phase 1420, and a horizontal flight phase 1430. The vertical takeoff phase can include starting the lift motors, e.g., the motors 89 described above (block 1411), and taking off vertically by increasing the thrust to the lift motors (block 1412). At block 1413, the aircraft 20 climbs vertically to a transition altitude, which is held (block 1414) for transition to horizontal flight.

The transition process 1420 can include starting one or more horizontal flight motors (block 1421), and increasing the thrust provided to the horizontal thrust motor(s) (block 1422) to increase the airspeed of the aircraft 20 (block 1423). At block 1424, the horizontal flight attitude controls are activated, and at block 1425, the altitude is maintained by controlling the lift motors. Accordingly, the aircraft 20 does not need to change its pitch angle to achieve sufficient horizontal speed. At block 1426, a comparison is made between the actual airspeed of the aircraft 1420 and the airspeed required for horizontal flight. If the actual airspeed is insufficient, the process returns to block 1423. If the airspeed is sufficient, then the aircraft moves to its horizontal flight phase 1430.

The horizontal flight phase 1430 can include turning off the lift motors (block 1431) and positioning the rotors to reduce or minimize aerodynamic drag, as discussed above with reference to FIG. 7. At block 1432, the aircraft 20 climbs to its cruise altitude, and at block 1433, the aircraft 20 performs its mission.

FIGS. 14C-14D illustrate the reverse process: a horizontal flight phase 1460, a transition to vertical flight 1470, and a vertical landing phase 1480, all of which form part of the overall process 1400. The horizontal flight phase 1460 includes reducing altitude from a cruise altitude to a transition altitude (block 1461) and shutting down or idling the horizontal flight motor(s). At the transition altitude, the airspeed is reduced (block 1463) and at block 1464, the lift motor(s) is activated, at a target value above the stall speed of the aircraft 20. For example, a representative target value is about 10% above the aircraft stall speed.

The transition from horizontal to vertical flight (block 1470) includes continuing to reduce the airspeed of the aircraft while maintaining altitude, for example, by pitching the aircraft (block 1471). Block 1472 includes determining whether the ground speed is less than or equal to a target speed (for example, three meters per second). If not, the process returns to block 1471. If the ground speed is less than or equal to the target speed, the process continues to the vertical landing flight phase 1480.

The vertical landing phase 1480 includes maneuvering the aircraft to a designated landing site (1481), reducing the aircraft altitude (block 1482) and turning off the lift motors (block 1483) as the aircraft touches down.

FIGS. 15A-15E schematically illustrate different thrust levels provided by different propellers or rotors of the aircraft 20 to maintain or change the orientation of the aircraft. For purposes of illustration, each of the four rotors 4 is identified separately as first-fourth rotors 4a-4d, and the corresponding thrust sectors are defined by arrows 80a-80d. The relative lengths of the arrows correspond roughly to the differential thrust values that may be provided by individual rotors.

Figure 15A:
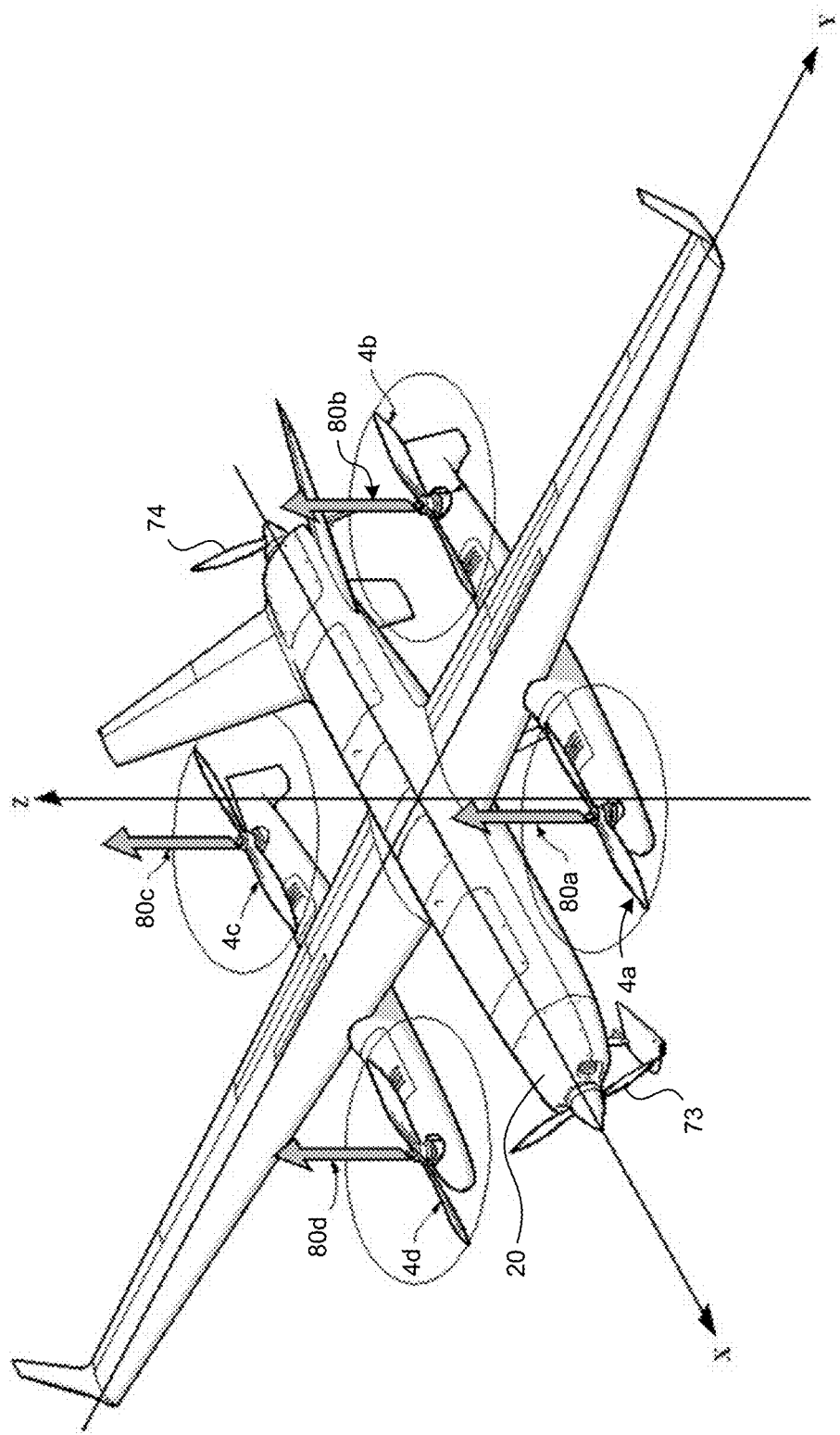
FIGS. 15A-15E schematically illustrate force vectors for changing the attitude of an aircraft in accordance with embodiments of the present technology.

Beginning with FIG. 15A, during steady vertical flight (ascent and/or descent), each rotor 4a-4d produces a generally similar or identical corresponding thrust level 80a-80d. The tractor propeller 73 and pusher propeller 74 are inactive.

Figure 15B:
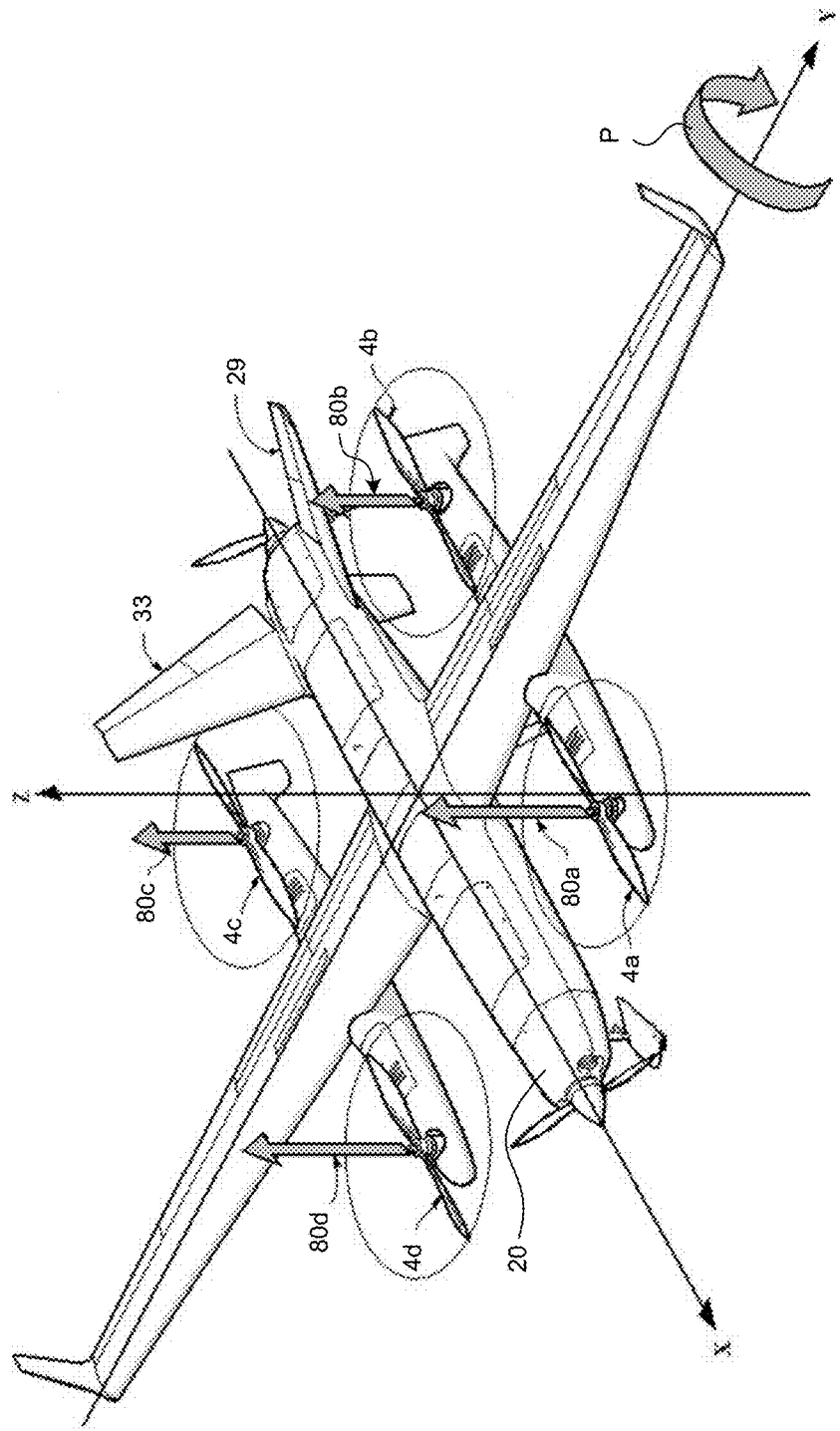
Figure 15C:
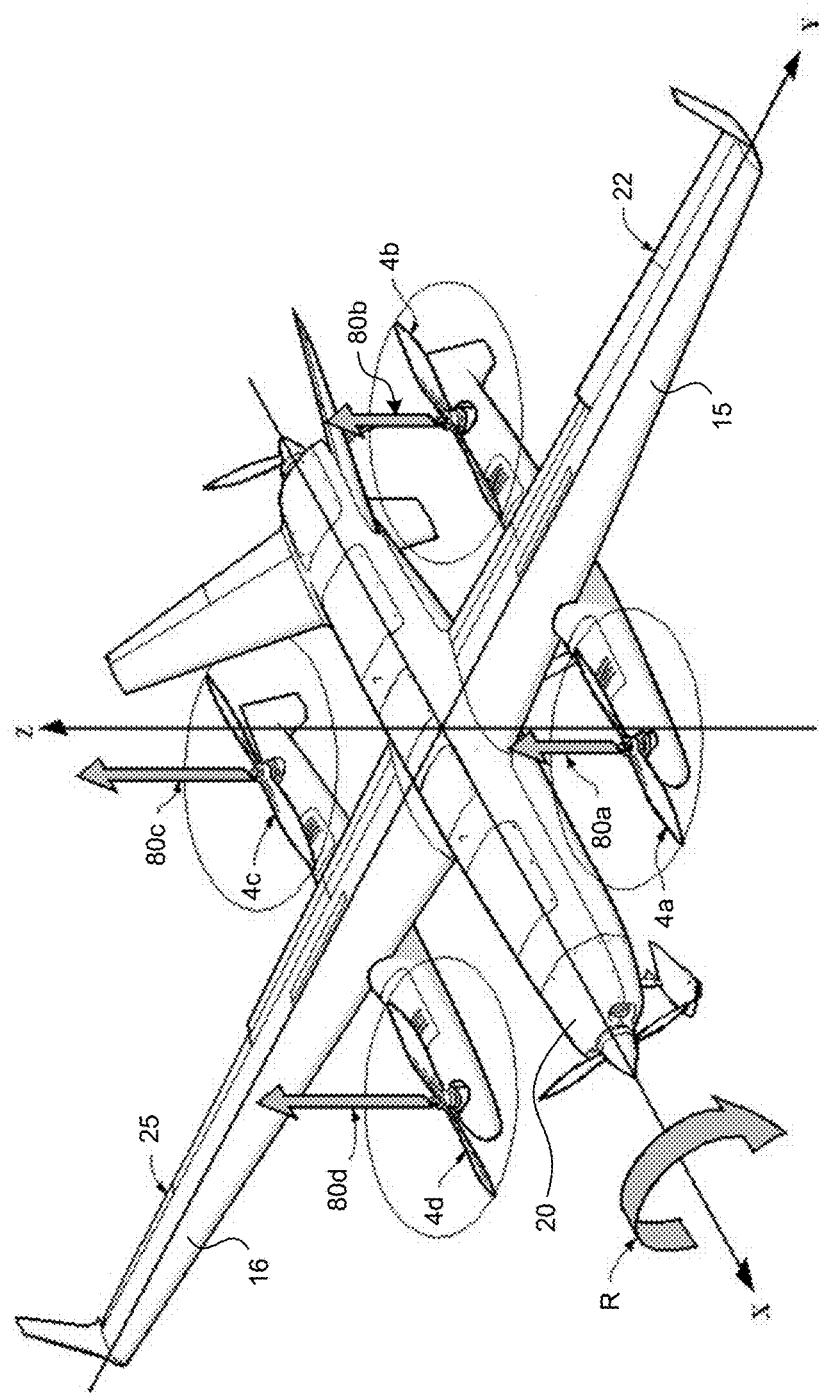

Referring next to FIG. 15B, the aircraft 20 pitches up as indicated by arrow P by increasing the thrust provided to the first rotor 4a and the fourth rotor 4d, relative to the thrust provided by the second and third rotors 4b, 4c, as indicated by arrows 80a and 80d. To roll left, as indicated by arrow R in FIG. 15C, the thrust provided by the third rotor 4c and the fourth rotor 4d is greater than the thrust provided by the first and second rotors 4a, 4b. In addition, the left elevators 22 can be deflected upwardly, and the right elevators 25 deflected downwardly, for example, if there is sufficient airflow over the wings 15, 16 to produce control authority.

Figure 15D:
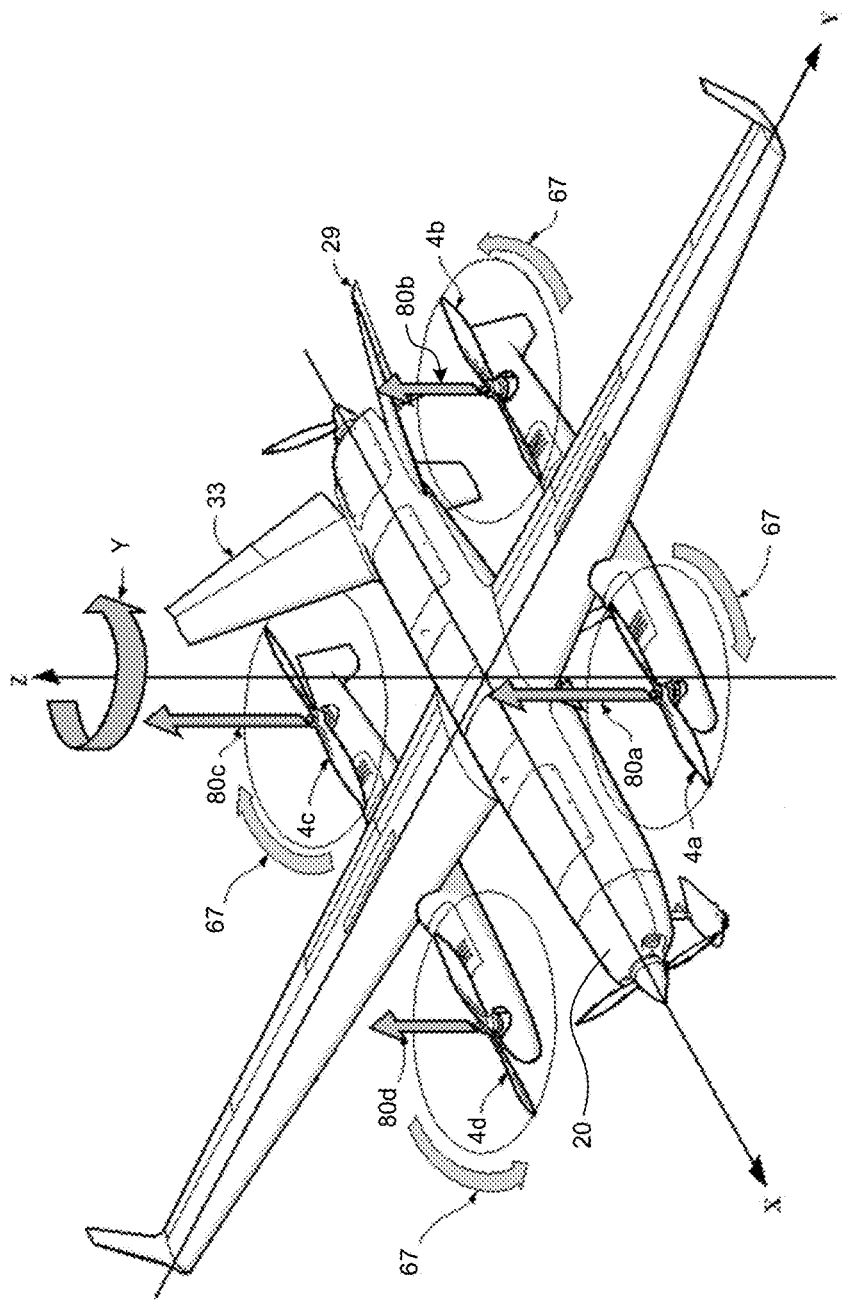

FIG. 15D illustrate a yaw operation. To yaw left, as indicated by arrow Y, the first and third rotors 4a, 4c produce more thrust than the second and fourth rotors 4b, 4d.

Figure 15E:
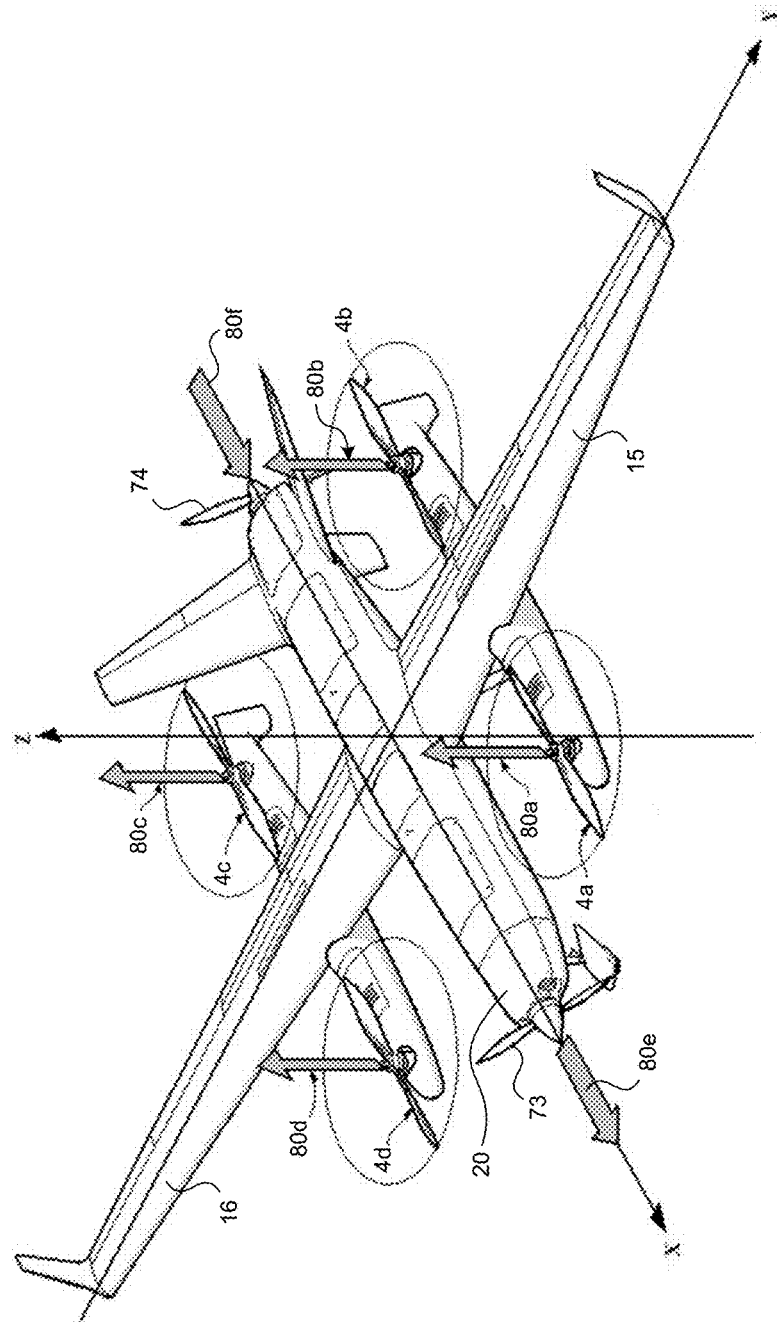

FIG. 15E illustrates an operation in which the aircraft 20 moves forward under the thrust 80e, 80f produced by the tractor propeller 73 and the pusher propeller 74. In addition, the thrust 80a-80d provided by the four lift rotors 4a-4d can allow the aircraft 20 to achieve forward speed without pitching to increase the angle of attack of the wings 15, 16.

A general advantage of modular nacelles in accordance with embodiments of the present disclosure is that they can add a VTOL capability to an aircraft that does not initially include it. Accordingly, aircraft initially having a fixed wing configuration can be retrofitted to have a VTOL configuration for greater mission flexibility. For embodiments in which the nacelles are readily removable, a further advantage is that the aircraft can be readily configured or reconfigured to have VTOL or no VTOL capabilities, depending upon the specific requirements of a particular mission.

Still a further advantage of at least some of the embodiments described above is that the second propulsion system can provide a degree of redundancy (whether or not the individual nacelles include internal redundancy) by providing a backup power and lift source for the first propulsion system. For example, if the first propulsion system fails during horizontal flight, the second propulsion system can allow the aircraft to make an emergency landing at sites that would be unavailable to the aircraft if it had only a fixed wing configuration.

From the foregoing, it will be appreciated that specific embodiments of the disclosed technology have been described herein for purposes of illustration, but that various modifications may be made without deviating from the technology. For example, the nacelles can have configurations other than those expressly described and shown in the Figures, and/or can be carried by fixed-wing aircraft having configurations other than those expressly described and shown in the Figures. For example, the aircraft can have a blended wing/body configuration in which the fuselage is blended with the wings.

The aircraft can be unmanned in particular embodiments, and manned in other embodiments. In particular embodiments, the nacelles are "permanently" attached to the aircraft wings in a one-time retrofit operation. The nacelles are subsequently removed only for maintenance and/or replacement. In other embodiments, the nacelles are deliberately configured to be readily removable, so that the aircraft can alternate between VTOL and non-VTOL configurations. The first (e.g., non-VTOL) propulsion system of the aircraft can be carried by the aircraft fuselage in certain embodiments, and by other structures (e.g., wings and/or tail) in other embodiments.

In particular embodiments described above, the power source that is included in the second propulsion system includes one or more batteries, e.g., rechargeable batteries. In other embodiments, the power source can include an internal combustion engine or another suitable device. Each nacelle can include a pair of rotors, a single rotor, or more than two rotors, depending on the embodiment. The nacelles can be attached to the aircraft wings, as discussed above, and/or to other aircraft structures, e.g., the wings or tail(s). The nacelles can be attached below the wings in some embodiments, and above the wings in other embodiments.

Certain aspects of the technology described in the context of particular embodiments may be combined or eliminated in other embodiments. For example, the nacelle connection features described above with reference to FIGS. 2A-2E can be used for other nacelle configurations. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated herein by reference conflict with the present disclosure, the present disclosure controls.

We claim:

1. An unmanned aerial vehicle system configured for VTOL (Vertical Take-Off and Landing), comprising:
an aircraft comprising:
a fuselage;
a first wing connected to the fuselage;
a second wing connected to the fuselage; and
a first propulsion system carried by at least one of the fuselage, the first wing, or the second wing; and
a removable second propulsion system that includes:
a first nacelle releasably coupled to a bottom surface of the first wing and detachable from the first wing in flight;
a second nacelle releasably coupled to a bottom surface of the second wing and detachable from the second wing in flight, wherein each of the first and second nacelles includes a power source and at least one VTOL rotor coupled to the power source.

2. The system of claim 1 wherein the power source includes a battery.

3. The system of claim 1 wherein the at least one VTOL rotor includes a first pair of counter-rotating VTOL rotors carried by the first nacelle and a second pair of counter-rotating VTOL rotors carried by the second nacelle.

4. The system of claim 1 wherein each of the first and second nacelles includes a stabilizing fin.

5. The system of claim 1 wherein the first and second nacelles each have a center of gravity longitudinally aligned with a center of gravity of the aircraft.

6. The system of claim 1 wherein the first and second nacelles each have an attachment mechanism positioned to releasably attach the corresponding nacelle to the corresponding wing.

7. The system of claim 6 wherein the attachment mechanism includes a bolted bracket.

8. The system of claim 1 wherein each of the first and second nacelles includes a release mechanism configured to release the corresponding nacelle in flight.

9. The system of claim 8 wherein the release mechanism includes an actuator.

10. The system of claim 8 wherein each of the first and second nacelles includes a deployable, in-flight speed reduction device.

11. The system of claim 10 wherein the speed reduction device includes a deployable lifting surface.

12. The system of claim 10 wherein the speed reduction device includes a deployable parachute.

13. The system of claim 1, further comprising a structural connection device connected between the first and second nacelles, independent of the fuselage, the first wing and the second wing.

14. The system of claim 1 wherein the first propulsion system includes at least one of a tractor propeller and a pusher propeller.

15. A method for configuring an unmanned VTOL (Vertical Take-Off and Landing) system, comprising:
in preparation for VTOL flight, releasably attaching a first nacelle to a bottom surface of a first wing of a fixed-wing unmanned aerial vehicle (UAV), and releasably attaching a second nacelle to a bottom surface of a second wing of the UAV, wherein each of the first and second nacelles includes a power source and at least one VTOL rotor coupled to the power source, and wherein each of the first and second nacelles is detachable from the corresponding wing in flight;
releasably coupling a first signal communication link between the first nacelle and the first wing; and
releasably coupling a second signal communication link between the second nacelle and the second wing.

16. The method of claim 15 wherein the UAV has a first center of gravity before the first and second nacelles are attached and wherein the UAV has a second center of gravity after the first and second nacelles are attached, and wherein the first and second centers of gravity have the same longitudinal location.

17. The method of claim 15, further comprising:
in preparation for non-VTOL flight, removing the first nacelle from the first wing of the UAV, and removing the second nacelle from the second wing of the UAV.

18. The method of claim 17 wherein removing the first and second nacelles includes removing the first second nacelles while the aircraft is stationary.

19. The method of claim 17 wherein removing the first and second nacelles includes removing the first second nacelles while the aircraft is in flight.

20. The method of claim 19, further comprising flying the first and second nacelles to a landing site, independent of the unmanned aerial vehicle.

* * * * *